United States Patent
Wilczynski et al.

(10) Patent No.: US 10,430,062 B2
(45) Date of Patent: Oct. 1, 2019

(54) SYSTEMS AND METHODS FOR GEO-FENCED DYNAMIC DISSEMINATION

(71) Applicant: Palantir Technologies Inc., Palo Alto, CA (US)

(72) Inventors: Peter Wilczynski, San Francisco, CA (US); John Carrino, Redwood City, CA (US); Daniel Zangri, Palo Alto, CA (US)

(73) Assignee: Palantir Technologies Inc., Palo Alto, CA (US)

(*) Notice: Subject to any disclaimer, the term of this patent is extended or adjusted under 35 U.S.C. 154(b) by 0 days.

(21) Appl. No.: 15/709,074

(22) Filed: Sep. 19, 2017

(65) Prior Publication Data
US 2018/0349007 A1    Dec. 6, 2018

Related U.S. Application Data

(60) Provisional application No. 62/512,628, filed on May 30, 2017.

(51) Int. Cl.
*G06F 16/29*    (2019.01)
*G06F 21/62*    (2013.01)
(Continued)

(52) U.S. Cl.
CPC .......... *G06F 3/04847* (2013.01); *G06F 16/29* (2019.01); *G06F 21/6218* (2013.01);
(Continued)

(58) Field of Classification Search
CPC .......... G06F 3/04847; G06F 17/30241; G06F 16/29; G06F 21/6218; G06F 2221/2149; G06F 3/0482; G06T 11/206; G06Q 10/101
See application file for complete search history.

(56) References Cited

U.S. PATENT DOCUMENTS 5,548,749 A    8/1996    Kroenke et al.
5,708,828 A    1/1998    Coleman
(Continued)

FOREIGN PATENT DOCUMENTS

AU    2011279270    9/2015
EP    0 816 968    1/1996
(Continued)

OTHER PUBLICATIONS

Dell Latitude D600 2003, Dell Inc., http://www.dell.com/downloads/global/products/latit/en/spec_latit_d600_en.pdf.
(Continued)

*Primary Examiner* — William L Bashore
*Assistant Examiner* — Daniel W Parcher
(74) *Attorney, Agent, or Firm* — Sheppard Mullin Richter & Hampton LLP

(57) ABSTRACT

Systems and methods are provided for sharing maps in a collaborative environment using classification-based access control. The generation of and dissemination of maps and/or data within such maps can be governed by classification-based access control, where a user's classification level can determine whether or not maps and/or data within those maps can be seen. In some scenarios, a user may wish to reveal the existence of data and/or additional details within a limited geographical area or subset of a map. The systems and methods further provide a geo-fenced view that can dynamically declassify data (to a specified degree). For example, declassified details can be revealed for moving data sets or objects upon entry into the geo-fenced view, and upon existing the geo-fenced view, the moving data sets or objects are reclassified.

19 Claims, 12 Drawing Sheets

(51) Int. Cl.
  *G06T 11/20* (2006.01)
  *G06F 3/0484* (2013.01)
  *G06Q 10/10* (2012.01)
  *G06F 3/0482* (2013.01)

(52) U.S. Cl.
  CPC .......... *G06Q 10/101* (2013.01); *G06T 11/206* (2013.01); *G06F 3/0482* (2013.01); *G06F 2221/2149* (2013.01)

(56) References Cited

U.S. PATENT DOCUMENTS

| | | |
|---|---|---|
| 5,765,171 A | 6/1998 | Gehani et al. |
| 5,870,761 A | 2/1999 | Demers et al. |
| 6,098,078 A | 8/2000 | Gehani et al. |
| 6,190,053 B1 | 2/2001 | Stahlecker et al. |
| 6,202,085 B1 | 3/2001 | Benson et al. |
| 6,216,140 B1 | 4/2001 | Kramer |
| 6,240,414 B1 | 5/2001 | Beizer et al. |
| 6,317,754 B1 | 11/2001 | Peng |
| 6,374,252 B1 | 4/2002 | Althoff et al. |
| 6,539,381 B1 | 3/2003 | Prasad et al. |
| 6,560,620 B1 | 5/2003 | Ching |
| 6,816,941 B1 | 11/2004 | Carlson et al. |
| 7,072,911 B1 | 7/2006 | Doman |
| 7,167,877 B2 | 1/2007 | Balogh et al. |
| 7,437,664 B2 | 10/2008 | Borson |
| 7,596,285 B2 | 9/2009 | Brown et al. |
| 7,676,788 B1 | 3/2010 | Ousterhout et al. |
| 7,730,396 B2 | 6/2010 | Chidlovskii et al. |
| 7,818,297 B2 | 10/2010 | Peleg et al. |
| 7,877,421 B2 | 1/2011 | Berger et al. |
| 7,962,495 B2 | 6/2011 | Jain et al. |
| 8,015,151 B2 | 9/2011 | Lier et al. |
| 8,290,990 B2 | 10/2012 | Drath et al. |
| 8,301,904 B1 | 10/2012 | Gryaznov |
| 8,312,546 B2 | 11/2012 | Alme |
| 8,316,060 B1 | 11/2012 | Snyder et al. |
| 8,380,659 B2 | 2/2013 | Zunger |
| 8,442,940 B1 | 5/2013 | Faletti et al. |
| 8,515,912 B2 | 8/2013 | Garrod et al. |
| 8,527,461 B2 | 9/2013 | Ducott, III et al. |
| 8,646,080 B2 | 2/2014 | Williamson et al. |
| 8,688,749 B1 | 4/2014 | Ducott, III et al. |
| 8,726,379 B1 | 5/2014 | Stiansen et al. |
| 8,782,004 B2 | 7/2014 | Ducott, III et al. |
| 8,838,538 B1 | 9/2014 | Landau et al. |
| 8,886,601 B1 | 11/2014 | Landau et al. |
| 9,009,827 B1 | 4/2015 | Albertson et al. |
| 9,104,695 B1* | 8/2015 | Cervelli ............ G06F 17/30241 |
| 9,275,069 B1 | 3/2016 | Garrod et al. |
| 9,330,157 B2 | 5/2016 | Ducott, III et al. |
| 2003/0084017 A1 | 5/2003 | Ordille |
| 2003/0088654 A1 | 5/2003 | Good et al. |
| 2003/0182313 A1 | 9/2003 | Federwisch et al. |
| 2004/0103124 A1 | 5/2004 | Kupkova |
| 2004/0111390 A1 | 6/2004 | Saito et al. |
| 2004/0250576 A1 | 12/2004 | Flanders |
| 2005/0034107 A1 | 2/2005 | Kendall et al. |
| 2005/0108063 A1 | 5/2005 | Madill et al. |
| 2005/0193024 A1 | 9/2005 | Beyer et al. |
| 2006/0036568 A1 | 2/2006 | Moore et al. |
| 2006/0106879 A1 | 5/2006 | Zondervan et al. |
| 2006/0155945 A1 | 7/2006 | McGarvey |
| 2006/0190497 A1 | 8/2006 | Inturi et al. |
| 2006/0206866 A1 | 9/2006 | Eldrige et al. |
| 2006/0218637 A1 | 9/2006 | Thomas et al. |
| 2006/0224579 A1 | 10/2006 | Zheng |
| 2007/0005707 A1 | 1/2007 | Teodosiu et al. |
| 2007/0026373 A1 | 2/2007 | Suriyanarayanan et al. |
| 2007/0112887 A1 | 5/2007 | Liu et al. |
| 2007/0168516 A1 | 7/2007 | Liu et al. |
| 2007/0180075 A1 | 8/2007 | Chasman et al. |
| 2007/0220067 A1 | 9/2007 | Suriyanarayanan et al. |
| 2007/0220328 A1 | 9/2007 | Liu et al. |
| 2007/0233756 A1 | 10/2007 | D'Souza et al. |
| 2007/0299887 A1 | 12/2007 | Novik et al. |
| 2008/0027981 A1 | 1/2008 | Wahl |
| 2008/0033753 A1 | 2/2008 | Canda et al. |
| 2008/0051989 A1* | 2/2008 | Welsh ..................... G06T 11/00 701/532 |
| 2008/0086718 A1 | 4/2008 | Bostick et al. |
| 2008/0141117 A1 | 6/2008 | King et al. |
| 2008/0148398 A1 | 6/2008 | Mezack et al. |
| 2008/0189240 A1 | 8/2008 | Mullins et al. |
| 2008/0235575 A1 | 9/2008 | Weiss |
| 2008/0243951 A1 | 10/2008 | Webman et al. |
| 2008/0320299 A1 | 12/2008 | Wobber et al. |
| 2009/0052806 A1* | 2/2009 | Morbey ................. G01C 21/00 382/302 |
| 2009/0172821 A1 | 7/2009 | Daira et al. |
| 2009/0199090 A1 | 8/2009 | Poston et al. |
| 2009/0207015 A1* | 8/2009 | Diem ................... G06Q 10/00 340/539.13 |
| 2009/0254970 A1 | 10/2009 | Agarwal et al. |
| 2009/0313299 A1* | 12/2009 | Bonev ................. G06Q 10/109 |
| 2010/0100963 A1 | 4/2010 | Mahaffey |
| 2010/0145909 A1 | 6/2010 | Ngo |
| 2010/0330801 A1 | 12/2010 | Rouh |
| 2011/0010342 A1 | 1/2011 | Chen et al. |
| 2011/0219450 A1 | 9/2011 | McDougal et al. |
| 2011/0246229 A1 | 10/2011 | Pacha |
| 2012/0005159 A1 | 1/2012 | Wang et al. |
| 2012/0016849 A1 | 1/2012 | Garrod et al. |
| 2012/0023075 A1 | 1/2012 | Pulfer et al. |
| 2012/0036106 A1 | 2/2012 | Desai et al. |
| 2012/0172027 A1* | 7/2012 | Partheesh ............ H04W 4/021 455/420 |
| 2012/0213416 A1* | 8/2012 | Lorimer ............ G06F 17/30241 382/113 |
| 2012/0215817 A1* | 8/2012 | Wheeler ............ G06F 17/30241 707/803 |
| 2012/0246705 A1* | 9/2012 | Brown ................. G06F 21/6218 726/4 |
| 2012/0254129 A1 | 10/2012 | Wheeler et al. |
| 2013/0006655 A1 | 1/2013 | Van Arkel et al. |
| 2013/0006668 A1 | 1/2013 | Van Arkel et al. |
| 2013/0067017 A1 | 3/2013 | Carriere et al. |
| 2013/0173540 A1 | 7/2013 | Qian et al. |
| 2013/0191336 A1 | 7/2013 | Ducott et al. |
| 2013/0191338 A1 | 7/2013 | Ducott, III et al. |
| 2013/0276799 A1 | 10/2013 | Davidson |
| 2013/0346444 A1 | 12/2013 | Makkar et al. |
| 2014/0011000 A1 | 1/2014 | Dunkmann et al. |
| 2014/0040182 A1 | 2/2014 | Gilder et al. |
| 2014/0040714 A1 | 2/2014 | Siegel et al. |
| 2014/0081652 A1 | 3/2014 | Klindworth |
| 2014/0114972 A1 | 4/2014 | Ducott et al. |
| 2014/0115671 A1* | 4/2014 | Abhyanker ............ H04W 4/021 726/4 |
| 2014/0129518 A1 | 5/2014 | Ducott et al. |
| 2014/0149130 A1 | 5/2014 | Getchius |
| 2015/0074050 A1 | 3/2015 | Landau et al. |
| 2015/0235334 A1 | 8/2015 | Wang et al. |
| 2015/0242969 A1* | 8/2015 | Pallas ................... G06Q 50/06 705/39 |
| 2015/0261847 A1 | 9/2015 | Ducott et al. |
| 2016/0019252 A1 | 1/2016 | Ducott et al. |
| 2017/0039666 A1* | 2/2017 | Kuersten ................. G06Q 50/28 |

FOREIGN PATENT DOCUMENTS

| | | |
|---|---|---|
| EP | 1647908 | 4/2006 |
| EP | 2911078 | 8/2015 |
| NL | 2011642 | 8/2015 |
| WO | WO 2008/113059 | 9/2008 |
| WO | WO 2011/161565 | 12/2011 |

(56) References Cited

FOREIGN PATENT DOCUMENTS

| WO | WO 2012/009397 | 1/2012 | |
|---|---|---|---|
| WO | WO-2013158147 A1 * | 10/2013 | ............... G08G 1/13 |

OTHER PUBLICATIONS

Dou et al., "Ontology Translaation on the Semantic Web 2005," Springer-Verlag, Journal on Data Semantics II Lecture Notes in Computer Science, vol. 3350, pp. 35-37.

Fidge, Colin J., "Timestamps in Message-Passing Systems," K. Raymond (Ed.) Proc. of the 11th Australian Computer Science Conference (ACSC 1988), pp. 56-66.

Holliday, JoAnne, "Replicated Database Recovery using Multicast Communication," IEEE 2002, pp. 11.

Lamport, "Time, Clocks and the Ordering of Events in a Distributed System," Communications of the ACM, Jul. 1978, vol. 21, No. 7, pp. 558-565.

Loeliger, Jon, "Version Control with Git," O'Reilly, May 2009, pp. 330.

Mattern, F., "Virtual Time and Global States of Distributed Systems," Cosnard, M., Proc. Workshop on Parallel and Distributed Algorithms, Chateau de Bonas, France:Elsevier, 1989, pp. 215-226.

O'Sullivan, Bryan, "Making Sense of Revision Control Systems," Communications of the ACM, Sep. 2009, vol. 52, No. 9, pp. 57-62.

OWL Web Ontology Language Reference Feb. 4, W3C, http://www.w3.org/TR/owl-ref/.

Parker, Jr. et al., "Detection of Mutual Inconsistency in Distributed Systems," IEEE Transactions in Software Engineering, May 1983, vol. SE-9, No. 3, pp. 241-247.

Symantec Corporation, "E-Security Begins with Sound Security Policies," Announcement Symantec, Jun. 14, 2001.

* cited by examiner

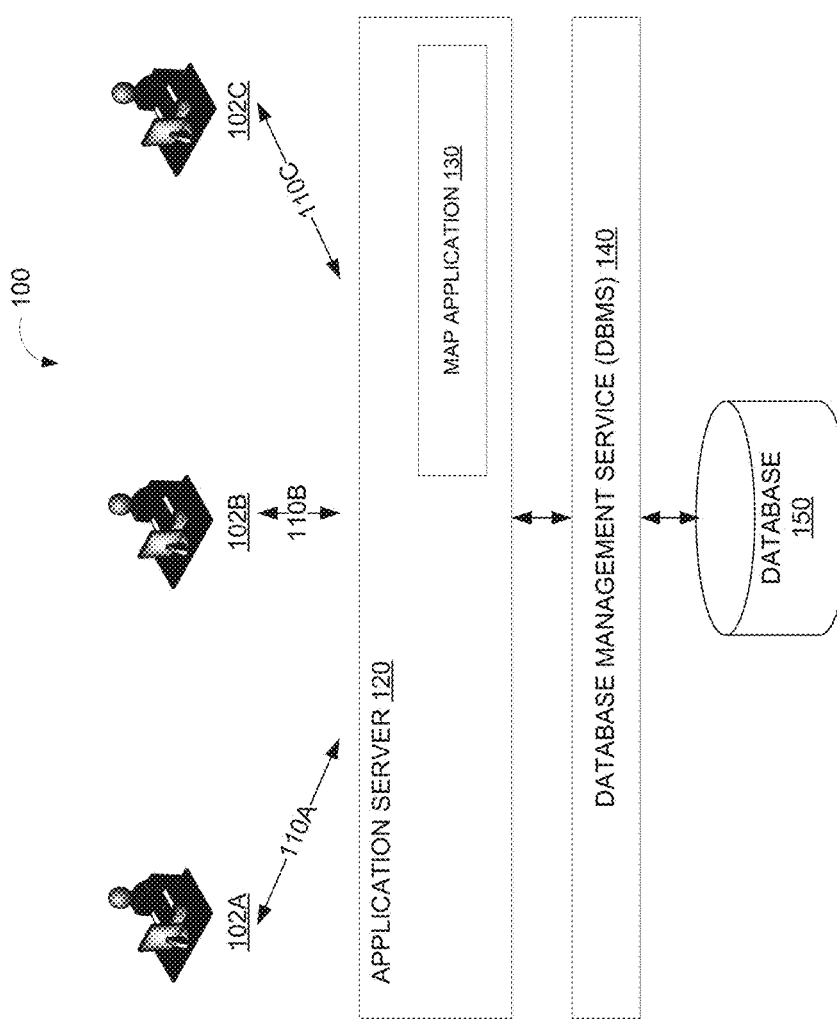

SYSTEMS AND METHODS FOR GEO-FENCED DYNAMIC DISSEMINATION

CROSS REFERENCE TO RELATED APPLICATIONS

This application claims the benefit under 35 U.S.C. § 119(e) of the U.S. Provisional Application Ser. No. 62/512,628, filed May 30, 2017, the content of which is hereby incorporated by reference in its entirety.

TECHNICAL FIELD

This disclosure relates to approaches for producing, displaying, and interacting with maps in collaborative environments.

DESCRIPTION OF RELATED ART

Under conventional approaches, software for producing and displaying documents, maps, graphs, and the like may utilize some form of classification-based access control. For example, a document may include a number of sections, each with its own classification level. In this example, user access to a given section of the document is permitted when a classification level of the user satisfies a classification level assigned to the section.

SUMMARY

In accordance with one embodiment, a system comprises one or more processors, and a memory storing instructions that, when executed by the one or more processors, cause the system to perform at least the following operations. A plurality of views of a map may be generated, each of the plurality of views comprising one or more objects presentable in accordance with a plurality of classification levels. A geo-fenced view comprising a virtual boundary encompassing a subset of the map in conjunction with one of the plurality of views of the map may be presented. One or more aspects of at least one of the one or more objects contained within the virtual boundary to another one of the plurality of classification levels may be declassified. The one or more declassified aspects of the at least one of the one or more objects in the geo-fenced view may be presented.

In some embodiments, the plurality of classification levels characterize amounts of information revealable by or through the one or more objects. In some embodiments, the one or more objects comprise at least one of entities represented as objects on the map, and wherein the one or more aspects of the objects comprise one or more properties of the objects, one or more object types, user-generated annotations, and metadata associated with one or more of the objects.

In some embodiments, the instructions, when executed by the one or more processors, cause the system to generate the geo-fenced view comprise instructions that, when executed by the one or more processors, cause the system to render one or more layers of the map in accordance with the plurality of classification levels, the one or more layers being representative of the one or more objects. The instructions, when executed by the one or more processors, cause the system to generate the geo-fenced view comprise instructions that, when executed by the one or more processors, cause the system to apply one or more filters adapted to select a subset of the one or more objects to be declassified.

In some embodiments, the instructions, when executed by the one or more processors, cause the system to present the geo-fenced view, comprise instructions that, when executed cause the system to present the geo-fenced view within a window defined by a classification banner. In some embodiments, the classification banner associated with the geo-fenced view is representative of a classification level that is more restrictive than that associated with the one of the plurality of views of the map presented in conjunction with the geo-fenced view.

In some embodiments, the one or more objects comprise moving data sets within the map.

In some embodiments, the instructions, when executed by the one or more processors, further cause the system to reclassify one or more aspects of the one or more objects upon the at least one of the one or more objects exiting the geo-fenced view.

In accordance with another embodiment, a computing device may comprise one or more processors, a memory storing instructions that, when executed by the one or more processors, cause the computing device to perform the following operations. Parameters characterizing a geo-fenced view comprising a virtual boundary encompassing a subset of a map presented on the computing device can be received. The geo-fenced view on the computing device may be presented in conjunction with a presentation of the map. A declassified view of one or more aspects of at least one of a plurality of objects contained within the virtual boundary in accordance with the received parameters may be presented. A reclassified view of the one or more aspects of the at least one of the plurality of objects upon the at least one of the plurality of objects exiting the geo-fenced view may be presented.

In some embodiments, the received parameters comprise user-specified parameters generated by a user of the computing device. In some embodiments, the parameters comprise a geographical specification of the virtual boundary. In some embodiments, the parameters comprise one or more filters configured to select the at least one of the plurality of objects for declassification upon entry into the geo-fenced view.

In some embodiments, the instructions, when executed by the one or more processors, cause the system to present the geo-fenced view, comprise instructions that, when executed cause the system to present the geo-fenced view within a window defined by a classification banner.

In some embodiments, the classification banner associated with the geo-fenced view is representative of a classification level that is more restrictive than another classification level represented by another classification banner associated with the presentation of the map.

In accordance with yet another embodiment, a method being implemented by a computing system may include one or more physical processors and storage media storing machine-readable instructions. The method may comprise receiving parameters specifying a geo-fenced dissemination view, and presenting the geo-fenced dissemination view as part of an existing map presentation in a classification-based access control environment. Upon entry of one or more objects into the geo-fenced dissemination view, the method may further comprise dynamically declassifying one or more aspects of the one or more objects in accordance with the received parameters.

In some embodiments, the method further comprises dynamically reclassifying the one or more aspects of the one or more objects in accordance with a classification level of the existing map presentation upon exiting of the one or more objects from the geo-fenced dissemination view. In some embodiments, the received parameters comprise a geographical specification of the virtual boundary relative to the existing map presentation.

In some embodiments, the received parameters comprise one or more filters configured to select the one or more objects for declassification upon entry into the geo-fenced dissemination view.

In some embodiments, the presentation of the geo-fenced dissemination view is performed under a classification banner commensurate with a classification level specified in the received parameters, the classification level being a more restrictive classification level than that associated with the existing map presentation.

These and other objects, features, and characteristics of the systems and/or methods disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

FIG. 1A illustrates a schematic representation of an example architecture of a classification-based access control collaboration system in accordance with various embodiments.

DETAILED DESCRIPTION

Overview

Figure 1B:
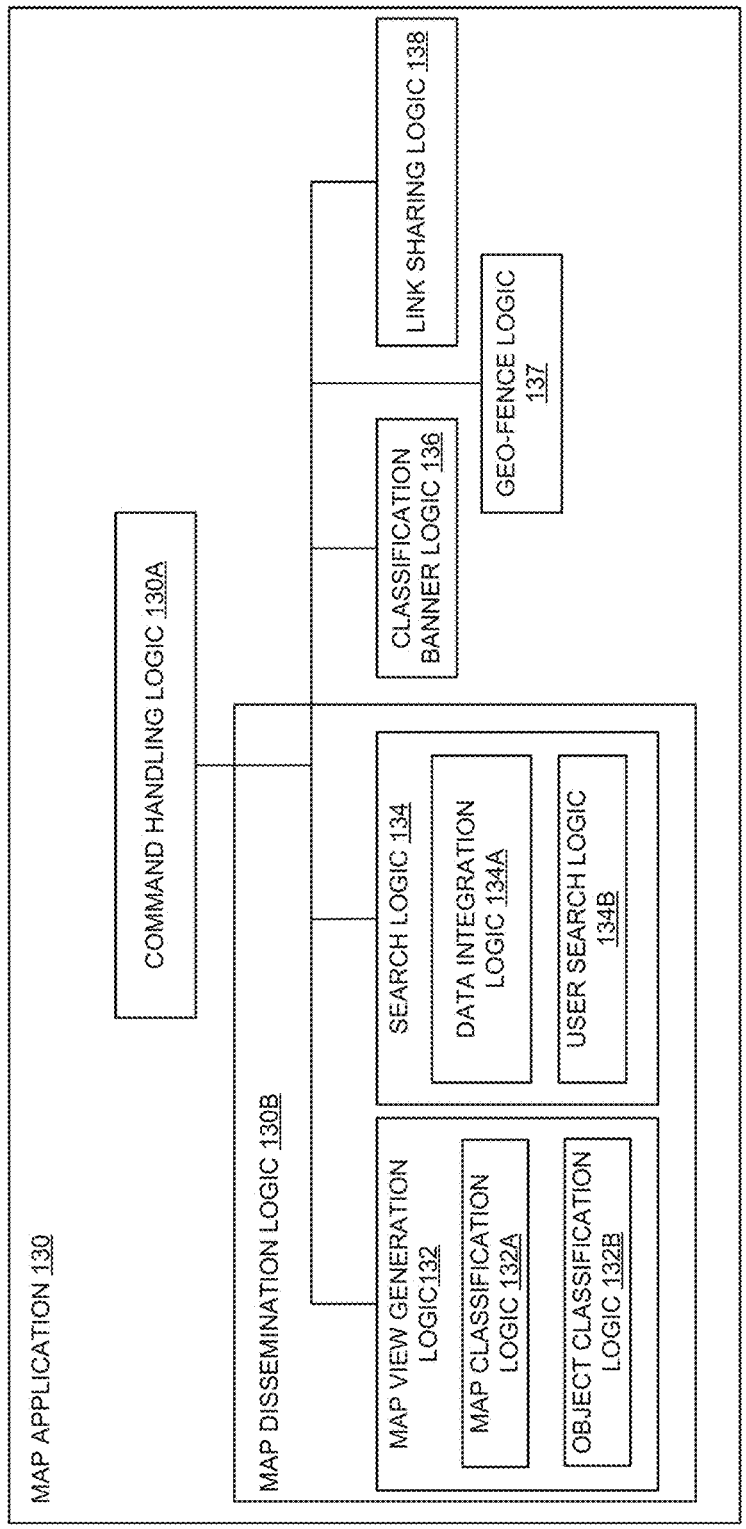
FIG. 1B illustrates a schematic representation of an example map application and corresponding logic of the classification-based access control collaboration system of FIG. 1.

A claimed solution rooted in computer technology overcomes problems specifically arising in the realm of computer technology. In various implementations, a computing system is configured to provide a collaboration environment in which the provenance of any/all data that can be disseminated is determined/tracked. In this way, users having differing levels of access to data (e.g., classification levels) that may be presented on a map can nevertheless view and/or interact with subsets of that data vis-à-vis different versions of the same map, where the different versions present data commensurate with their level of access.

Searches for data that are to be disseminated in, for example, a map, (e.g., objects within a certain area of interest, such as buildings, roads, etc.) can be pre-computed in accordance with different classification levels. Moreover, maps can be rendered in layers or planes corresponding to different display aspects of maps, for example a search layer, an annotations layer, etc. During a collaborative presentation, those layers or planes can be stacked, hidden, modified, etc. to result in a particular map view or version, each of which comply with any restrictions/permissions based on respective levels of classification associated with users participating in the collaborative presentation. Metadata associated with the searched objects can change based on classification level as well. Moreover, a user may lock/unlock a map to allow the user to move amongst different classification levels without risking inadvertent dissemination of sensitive information. Further still, users having less permissive classification levels need not necessarily be aware of information they are not privy to. In some embodiments, redacted views of a map can be presented.

In some embodiments, when a user conducts a search for objects, the search, the objects, and any objects returned by the search can be saved and classified. The user can be given control over each of these search aspects, thereby allowing the user to rerun searches at differing classification levels. This allows for the above-mentioned redaction.

In some embodiments, any user-generated annotations are classified at a user's current classification level.

In some embodiments, a legend can be generated in accordance with a user's desires, such that one or more legend "item" can be included, added, deleted, edited, etc. in a map. Moreover, such a customized legend can be specified to be operative or be displayed within certain areas of the map. For example, if a user moves from one portion of a map to another, the legend my dynamically change.

In some embodiments, recursive banners are implemented in such a way that any data presented under a banner is classified at that banner's classification level. Additionally, in cases where a first banner having a lower classification level than a second banner in or under which the first banner is presented, any data within the first banner cannot be classified at a level above that of the second banner.

In some embodiments, links can be shared with recipients without requiring the recipient to log in or be authenticated. A link to a particular map rendered at a particular classification level can be generated and sent to a desired recipient. The classification banner under which the particular map is rendered can be used as part of the link, e.g., the classification banner can be parsed, e.g., serialized, and included as part of the link. The desired recipient may use the link to view the map at the particular classification level without the recipient having to log in or be, e.g., a registered user of the system used to generate the map. Information regarding the link/underlying map can be monitored, e.g., the number of users viewing the map, expiration time, etc. Moreover, the creator of the link can, at any time, revoke access to the underlying map. Users may have an option to log in through the link to get greater than the link-provided access.

In some embodiments, classification levels can be specified for moving objects or data sets in terms of certain geographical portions of the map, e.g., in accordance with a geo-fence. Objects within the boundaries of a specified geo-fence can be dynamically declassified, whereas objects outside the boundaries of the specified geo-fence are classified in accordance with the classification level of the map within which the specified geo-fence is created. If declassified objects move outside the boundaries of the specified geo-fence, the objects are dynamically reclassified to the classification level of the map within which the specified geo-fence is created.

Map Sharing System

In some embodiments, the present disclosure relates to a collaborative presentation system in which different versions of the same map can be viewed by different users having different classification levels at the same time. This allows a user to share data and collaborate with other users in a way that does not compromise sensitive data. For example, a first user may be associated with a first classification level that allows the first user to see some set of data on a map. A second user may be associated with a second classification level that allows the second user to see only a subset of the data the first user is able to see on that same map. The first user can view a first version of the map that displays data the first user is allowed to see, while the second user can view a second version of the map that displays only the data the second user is allowed to see. The first and second users are able to collaborate regarding data that is common to both the first user and the second user, i.e., the subset of data accessible by the second user. Thus, despite the disparity in classification level, the first user and second user may still collaborate without the first user "losing access" to the data he/she is privy to. In conventional systems, the first user may downgrade his/her associated classification level in order to present data to the second user. However, once a user downgrades his/her classification level, he/she is not allowed to upgrade or return to his/her higher classification level. If the first user wishes to view the data to which only he/she is privy to, he/she must recreate or regenerate a map in accordance with his/her classification level.

An example map sharing system 100 is illustrated in FIG. 1A. As shown, the system 100 includes one or more user sites 102A-C operatively coupled respectively by one or more network communication links 110A-C to an application server 120 that hosts a map application 130. The map application 130, as part of the application server 120, accesses a database 150 by way of a database management system or service (DBMS) 140. User sites 102A-C and application server 120 may comprise one or more computers that host or execute logic or stored programs configured to perform the processes that are further described herein.

At each user site 102A-C, there may be a client computing device used by a user at that site that communicates and exchanges data with application server 120 over one or more network communication links 110A-C. The client computing device may be any client computer such as a workstation computer, a laptop computer, a tablet computer, a mobile phone, or other client computing device that has or is operatively coupled to a display, e.g., a video/multimedia display. While only three user sites 102A-C are shown in FIG. 1A, the system 100 may include more than three or less than three user sites 102A-C.

Any one or more of network communication links 110A-C may traverse one or more data networks (e.g., Local Area Networks and Wide Area Networks). A network communication link may be based on a reliable network transport protocol such as TCP/IP or the like. A network communication link 110A-C between user site 102A-C, respectively, and the application server 120 may be established as and when needed, for example, when the application server 102 or a client computing device at the user site needs to send data to the other. Alternatively, a network communication link, e.g., any one of network communication links 110A-C may span the life of a session during which data is sent back and forth between the application server 120 and a user site in multiple communication exchanges. Either the application server 120 or a client computing device at a user site, e.g., user site 102A, may initiate establishment of a network communication link 110A. The network communication link 110A may traverse a number of intermediary devices (e.g., web servers, cache servers, proxy servers, content delivery network servers, etc.) between an application server 120 device and the client computing device at the user site 102A. In this case, the one or more network communication links 110A-C may be viewed as a logical network communication link made up of a number of sub-network communication links connecting a client computing device to application server 120 through the intermediary devices in a network.

In some embodiments, operating on the database 150 (i.e., the organized information actually stored on a storage device) is a database management service (DBMS) 140 that, among other operations, processes requests from the application server 120 for access to information in the database 150. The map application 130 may interact indirectly with the database 150 through the DBMS 140 that in turn interacts directly with the database 150 to provide high level database operations to the map application 130, such as retrieval and storage of information in the database 150. No particular type of database management service is required and any database management service capable of supporting the graph sharing techniques described herein may be used. In some embodiments, as examples, the DBMS 140 is a relational database management system such as those commercially available from Oracle Corporation of Redwood Shores, Calif. and Microsoft Corporation of Redmond, Wash. Other embodiments may use open source databases.

In some embodiments, the database 150 (or a portion or portions thereof) is stored in volatile memory for faster data access to database data. In this case, the database 150 may be backed by a shadow copy of the database 150 stored in a non-volatile memory in case of power loss to the volatile memory.

A client computing device at one or more of user sites 102A-C may be configured with a Web browsing application or other client application for performing client functions of the map application 130. Among others, the client functions include presenting various map application 130 user interfaces on a display of a client computing device, as instructed over one or more network communication links 110A-C by the map application 130. The client functions may also include receiving user input from the user of the client computing device and transmitting data representing user input to the map application 130 over one or more network communication links 110A-C. The map application 130 may instruct the client application to present various map application user interfaces using standardized Web instructions sent over one or more network communications links 110A-C to a client computing device. Such Web instructions may involve standardized Web protocols (e.g., HTTP, HTTPS, etc.) and include standardized markup language instructions (e.g., XML, HTML, XHTML, etc.), standardized style sheet language instructions (e.g., CSS, etc.), and standardized client-side scripting language instructions (e.g., JavaScript®, ActionScript®, and Jscript®, etc.). Receipt of data by map application 130 representing user input may also involve standardized Web protocols and standardized Web instructions.

The application server 120 contains map application 130 and operates on one or more server computing devices. The server computing devices on which the map application 130 operates may be considered to be operatively coupled to the client computing devices at user sites 102A-C by network communication links 110A-C. The application server 120 may provide fundamental application data services to the map application 130 such as handling network communications with user sites 102A-C and providing one or more interfaces to the map application 130 for communicating with the DBMS 140. According to some aspects of various embodiments disclosed herein, the map application 130 is implemented using the Java programming language. However, implementation with other programming languages or in hardware (e.g., hard-wired logic, one or more ASICs or FPGAs, firmware, etc.) are also possible.

A user at a user site 102A may conduct a collaborative presentation involving data objects stored in the database 150 using, for example, a computing device at user site 102A. Generally, searches for data objects may be on a subset of shared database data drawn from a shared data repository in the database 150. The user at user site 102A may wish to share a map having data objects with another user at a user site 102B, for example. Both users at user sites 102A and 102B may access and view the map of interest by accessing application server 120 and executing map application 130, where if the users have differing classification levels, each user sees a different version of the map of interest commensurate with that user's classification level.

The user at user site 102A may create a new map. Map application 130 may generate one or more versions, also referred to as "dynamic dissemination views" of the map. It should be noted that map application 130 may generate different versions commensurate with all classifications up to a maximum classification level. Even if the user at user 102A created the map, the user may not have a classification level allowing him/her to access data on the map at the maximum classification level, in which case the user is limited access dynamic dissemination views that match the user's classification level(s).

The user at user site 102A may add data objects to a map. Examples of such data objects include, but are not limited to user-created annotations, such as lines, arrows, other identifying marks, text, and the like. These annotations may also be classified. In some embodiments, objects associated with a map legend can be added, deleted, or changed in some way. Moreover, the map legend can be configured for use with particular areas or portions of a map, such that different legends can appear depending on what area or portion of a map is being displayed. If the user at user site 102A wishes to upload data to database 150, map application 130 may prompt the user to classify the data to be uploaded.

The user at user site 102A may wish to conduct a search for data within an existing map. Similar to the annotations and uploaded data, the search terms, any search-related metadata, as well as the results of the search may also be classified. It may be that the user at user site 102B has a lower classification level than that of the user at user site 102A, and the user at user site 102A wishes the share the results of the search with the user at user site 102B. Accordingly, map application 130 stores the results of the search in accordance with different classification levels, also referred to as a "viewing set." In this way, the search can be shared amongst users while still protecting classified data if need be.

A user, e.g., the user at user site 102A may wish to present a particular layer on a map, where layers can be rendered in accordance with different classification levels. Moreover, metadata associated with data objects in the maps can be added at the maximum classification level and presented in accordance with layers and their corresponding classification levels. Similarly, the user at user site 102B may wish to import another map created by the user at user site 102A into a map the user at user site 102B is creating. Regardless of the classification level that the user of user site 102A may have saved his/her map, the map imported by the user at user site 102B will only reveal/contain data objects commensurate with the classification level associated with the user at user site 102B.

A user may wish to view a map at a particular classification level. For example, user 102A may wish to a view a map at a classification level lower than the user's maximum classification level, e.g., that of the user at user site 102B. A user may wish to view a map at a different classification level if, for example, the user wants to view the map at the classification level it will be viewed by another user with which the map is going to be shared. This may be done to check the map to ensure no sensitive data is being revealed and/or for the user to be aware of what the other user will see. The use of layers, searching for data, and data objects will follow that of the specified classification level at which the map is being viewed.

It should be noted that in some cases, the classification of one or more data objects cannot be satisfied in a current view. In this case, the one or more data objects may be presented by map application 130 as a redacted element. Handling of redacted elements will be described in greater detail below.

A user may also change the "minimum access classification" of a map, i.e., the classification required to view any of the dynamic dissemination views for that map. Map application 130 may provide an interface that a user, e.g., the user at user site 102A, may use to specify, e.g., user details, classification level details, access group details as well the specification of access groups, etc. As described above, a user may which to change his/her viewing classification level to protect against inadvertent security leaks. Similarly, map application 130 may provide an option to preview a map as part of is reclassification to again, protect against inadvertent, and oftentimes subtle security leaks. In addition to the map itself, data objects that may be included in the map can be reclassified, as well as searches, e.g., the classification of a search folder which protects the query and associated metadata, and that of the search results.

A user, e.g., the user at user site 102A may wish to share a particular map with another user, e.g., the user at user site 102B or some other user that is not necessarily a part of map sharing system 100. In this case, the user at user site 102A may generate a link to the particular map (rendered in accordance with a particular classification level) that can be forwarded to a desired recipient. The desired recipient may view the particular map at the particular classification level specified by the user at user site 102A within the generated link without having to log into map sharing system 100, e.g., application server 120 and/or map application 130.

A user, e.g., the user at user site 102A may wish to share certain information or data within a certain area of a map, particularly in the case of moving data sets or objects, e.g., cars, people, etc. that are moving about within a particular geographical area. In this case, the user at user site 102A may create geo-fenced dynamic dissemination view. The user may create a geo-fence or virtual boundary encompassing some portion(s) of the map by specifying parameters describing the characteristics of the geo-fence within map application 130. The parameters can include, but are not limited to coordinates or some other indication of the virtual boundary, data objects that can be declassified upon entry into the geo-fence as well as a classification level at which the data objects are to be presented. Another user, e.g., the user at user site 102B through its instance of map application 130 may view the map and the geo-fenced dynamic dissemination view. Objects that may not be viewable by or rendered for the user at user site 102B in the broader map view may be viewable by or rendered for the user at user site 102B upon those objects entering the geo-fenced dynamic dissemination view. Upon exiting the geo-fenced dynamic dissemination view, the user at user site 102B will no longer be able to view the objects as they return to their "original classification."

It should be noted that a geo-fenced area need not be limited to moving objects. For example, the user at user site 102A may be a real estate agent that wants to reveal certain information to a potential buyer about a house and immediately neighboring properties to discuss, e.g., property easements or changes the potential buyer wishes to make that may have an impact on neighboring properties. In this case, the real estate agent, through map application 130, may generate an appropriate geo-fenced dynamic dissemination view the encompasses the houses of interest, and provides the desired amount of declassification that may be shared with the potential buyer.

Map Sharing Application

FIG. 1B is a schematic representation of map application 130. Map application 130 can include a number of components and/or logic elements which may be implemented in software or hardware or a combination of the two. Map application 130 may include a command handling logic element 130A for receiving notification of commands input by a user through user interface controls presented on the client computing device at a user site and for dispatching received commands to the appropriate logic element of the map application 130 to handle the command.

Map application 130 may further include map dissemination logic element 130B for controlling the dissemination of different map views or versions as disclosed herein. Map view generation logic element 132 may generate different map views in accordance with classification levels, which in turn may be governed by map classification logic element 132A. The classification of objects included or added to a map may be controlled by object classification logic 132B. Objects may include existing data/objects as well as user-generated annotations, such as drop points, lines, text annotations, aspects or objects of a dynamic legend, etc.

If a user wishes to view a map at a given classification, changes to the map view in consideration of the change in classification level can be effectuated through map classification logic element 132A. Map view generation logic element 132 may generate a map in accordance with the change to the classification level and/or access a previously generated map view commensurate with the changed classification level. Map dissemination logic element 130B may control the display of the particular map view on a client computing device at a user site.

Map application 130 may further search logic element 134, which encompasses, in part, data integration logic element 134 for controlling the initial population of map views with data/objects. In accordance with various embodiments, backend, pre-computed searches can be run at different levels corresponding to the different classification levels at which map views can be generated. In accordance with some embodiments, a user interface of map application 130 may present a user with an option to search for and display data objects (effectuated by user search logic element 134B), such as buildings within a particular area of a map. Because map view generation logic element 132 may generate different map views in accordance with different classification levels relying at least in part, on such pre-computed searches performed by data integration logic element 134A so that the appropriate data/objects are returned on a user-initiated search in the context of a particular map view.

It should be noted that user search logic element 134B may further control the classification of a user-initiated search itself. As alluded to previously, search queries, e.g., search terms, search metadata, search "folders," and search results may all be classified. For example, a user may wish to drill down on the aforementioned search for buildings by searching for particular building aspects, metadata associated with buildings, etc. Map application 130 may not necessarily be aware of any classification level relevant to a user-initiated search that is being conducted, and the various aspects of a search may be classified. In some embodiments user search logic element 134B may initiate the running of searches at different possible classification levels. If a user wishes to rerun a search at different classification levels, the user can be accommodated. Working in conjunction with object classification logic element 132B and/or data integration logic element 134A, different objects may load in accordance with different classification levels, objects may be redacted or hidden from view, etc.

When a map contains a redacted element, map view generation logic element 132 may provide options to a user allowing a redacted element to be rendered in accordance with the user's desires: (1) each redacted element in a given section may be rendered independently; (2) all redacted elements in a given section may be coalesced and rendered together as a set of redacted elements; and (3) redacted elements may be hidden. To prevent users from deleting parent folders which contain at least one redacted element, we show that there are redacted elements inside of any folder which contains a redacted sub-folder or feature. If simply showing that there is a redaction inside a folder can amount to a security leak, users may reclassify the folder. If showing the folder name itself is a leak, the user may also reclassify the folder. When reclassifying a folder, users can choose to classify just that folder, or the folder and all of the manually entered data inside of it. When reclassifying data on a map, the user is choosing a valid classification for that piece of data. In each of these cases, the ramifications of the operation can be serious, and the one or more user interfaces presented by map application 130 can be configured to communicate the side effects of a reclassification operation to a user.

It should also be noted that metadata can be data that is displayed or included in the presentation of a particular map. Under control of object classification logic element 132B, metadata associated with one or more objects may also be classified. Accordingly, based on determinations made by data integration logic 134A in conjunction with map view generation logic element 132, map dissemination logic element 130B may ultimately present different map views including, e.g., different versions of metadata, the inclusion or exclusion of metadata depending on relevant classification levels.

Map application 130 may further comprise classification banner logic element 136. Within classification-based access control, requirements may be set forth regarding what classification banners are and how they relate to each other. Classification banners can refer to a hierarchical organization scheme used to maintain classification level consistency when maps are displayed in a client computing device that rely on, e.g., colored and textual indicators of classification levels associated with map(s) contained "under" a classification banner or "in" window labeled with a particular classification banner. For example, a user may present a map within a window labeled in accordance with, e.g., the map's "effective classification." Any map(s) or data falling within or under a classification banner is classified at that classification banner's classification level. If another window is opened within or under a particular classification banner, that other window cannot contain any map(s) or data that exceed the classification level of the window in or under which it is opened as specified by the classification banner.

Map application 130 may also include geo-fence logic element 137. A user may create a geo-fenced dissemination view by specifying relevant parameters, such as the coordinates of the virtual boundary encompassed by the geo-fenced dissemination view, one or more layers specifying objects that can be declassified within the geo-fenced dissemination view, as well as any filtering parameters to be applied to those objects when they are within the geo-fenced dissemination view. Geo-fence logic element 137 may receive these parameters as input and coordinate with map dissemination logic 130B and/or its one or more components/logic elements to present the geo-fenced dissemination view.

Geo-fence logic element 137 may further coordinate operation with classification banner logic element 136. That is, each geo-fence dissemination view is presented under a classification banner (which must be commensurate with a classification level "below" that of the existing map in which the geo-fenced dissemination view is created).

Depending on the parameters that have been specified to geo-fence logic element 137, geo-fence logic element 137 can operate to release certain information regarding the object(s) of interest. For example, certain properties regarding the object(s) of interest can be displayed to a user, e.g., location, details, etc. of the object(s) of interest, as can certain metadata commensurate with the specified classification level of the geo-fenced dissemination view. In some embodiments, only the location of the object(s) of interest may be displayed or revealed to a user. It should be noted that because in some embodiments, the object(s) of interest can be specified by a user vis-à-vis the user of layers, objects within a geo-fenced dissemination view can be treated similarly to non-geo-fenced data. That is, objects/object data can be presented at multiple classification levels up to that of the specified classification level for the geo-fenced dissemination view. In some embodiments, a geo-fenced dissemination view may show redacted locations, e.g., counts by region, or clusters of objects, in order to prevent revealing specific object locations.

Essentially, geo-fence logic element 137 temporarily reclassifies objects within a particular geographical area or boundary through user-specified filters in the context of classification-based access control. Geo-fence logic element 137 can also be considered to reclassify objects or allow objects to return to their "original" classification upon exiting a particular geographical area or boundary (the user-specified filters cease to apply), e.g., upon returning to the purview of the overall map. It should be note that this particular reclassification is not to be confused with reclassification in the context of the map itself (as also described herein).

Because geo-fence logic element 137 acts by declassifying information, in some embodiments, "outside" authorization may be given before actual declassification is allowed. That is, a proper authority figure may, in some embodiments manually provide authorization to perform the declassification described herein. In some embodiments, the user creating the geo-fence dissemination view may have the requisite authority to proceed with declassification. Declassification authorization may be received through command handling logic 130A.

It should be noted that in some embodiments, geo-fenced dissemination views can overlap in which case, one or more parameters specifying respective filter(s) defining the geo-fenced dissemination views can be logically combined so that proper objects and/or data can be displayed in the overlapping area(s) of the two or more geo-fenced dissemination views.

Further still, map application 130 may comprise link sharing logic element 138. Link sharing logic element 138 can be used to present an option to share a link to a particular map view at a particular classification level associated with the map view. Link sharing logic element 138 may access information regarding a classification banner under which a particular map view is rendered, e.g., via classification banner logic 136, and, e.g., serialize the classification level/classification banner to include as part of the link. Upon a recipient of the link accessing the map view, link sharing logic element 138 may provide the link-generating user with information/statistics regarding the map view shared through the link. For example, the link-generating user may view who is viewing the map view and/or for how long. The link-generating user may further revoke access to the map view at any time through a link sharing user interface. In this way, a more restricted version of a map, e.g., a map view having a higher classification level can be protected without limiting the ability to share information with a non-registered user.

Map Sharing Database

Figure 1C:
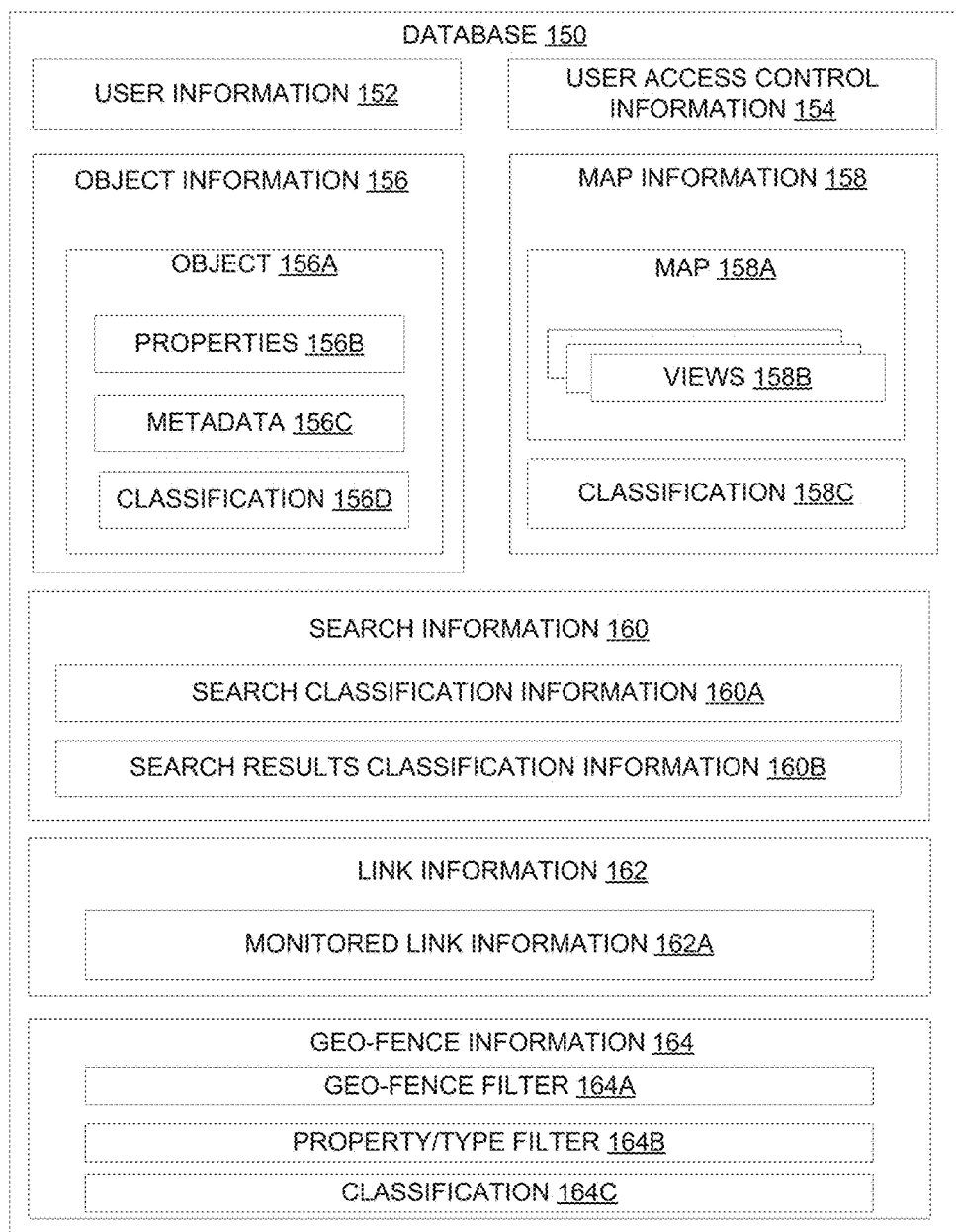
FIG. 1C illustrates a schematic representation of an example database of the classification-based access control collaboration system of FIG. 1.

FIG. 1C is a schematic representation of information stored in the database 150 involved in map sharing in accordance with various embodiments. Conceptually, the database 150 may be thought of as being segmented into user information 152, user access control information 154, object information 156, map information 158, search information 160, link information 162, and geofence information 164. It should be understood that no particular type of database is required and any database capable of supporting the map sharing techniques described herein may be used. As just one non-limiting example, the database 150 may be a relational database. The information stored in the database 150 may also be stored as a result of performing map sharing operations in computer memory of the server computing devices that operate the map sharing application 130 and in computer memory of client computing devices at user sites 102A-C.

User information 152 can include data identifying individual users of the map sharing application 130. Such data may include user identification information uniquely identifying individual users and credential information for authenticating individual users. Credential information may include username and password information and/or cryptographic digital certificate information as examples. User information 152 may also include collaboration team data. A collaboration team can refer to a set of one or more users identified by a team name. Collaboration teams allow reference to a set of one or more individual users by a single identifier akin to e-mail messaging groups.

User access control information 154 may include information identifying which access control or classification levels users may have. In some embodiments, there are two types of access control levels: groups and classifications. Groups may also be referred to as roles. The access control groups to which a user belongs determine what operations the user can perform on which data comprising one or more objects 156A. The access control groups to which a user belongs may also determine what objects 156A the user can display in one or more maps 158A. The classification levels a user has can determine what objects 156A the user has access to and what objects 156A the user can bring into a map 158A.

A user may belong to more than one access control group and have more than one classification level. Access control groups and classification levels may be hierarchical such that, if a user belongs to an access control group or has a classification level higher in the hierarchy, then the user implicitly belongs to all groups and has all classifications lower than that group or classification level in the hierarchy.

When specifying an access control group, an access control item includes an access control group name or identifier and a permission of that access control group. In some embodiments, there are four permissions levels: discovery, read, write, and owner. With the discovery permission, a user can be notified of and know that data exists but cannot view the data. With the read permission, a user can find and read the data but cannot change the data. With the write permission, a user can find, read, and change the data. With the owner permission, a user can find, read, change, and adjust the permissions on the data. Thus, permissions may be cumulative. For example, a user that has the write permission with respect to data implicitly also has the read and discovery permissions with respect to that data. Embodiments are not limited to these four permission levels and other sets of permissions levels may be used.

When specifying a classification level, an access control item or information element may include a classification marking that identifies the classification. Example classification markings include, but are not limited to, e.g., "Confidential," "Restricted," and "Unclassified." For example, classification markings can be used in the context of interactive census maps and data that can be shared to unclassified citizens, classified government personnel, etc. There may be myriad other classifications upon the context in which various embodiments may be used. For example, maps may be shared between tourists and other family members using mobile device mapping/map sharing applications. Other applications allow fellow travelers to share maps in order to get travel recommendations. In this case, the tourist or traveler may want family members or other travelers to only see a particular area to which he/she is traveling without revealing an entire map "itinerary." Accordingly, classification markings in this context may include simply, Planner/User and Viewer. Still another context may involve a real estate agent and potential buyer/seller. In such a scenario, a real estate agent may have detailed and/or confidential information regarding real estate properties. When interacting with potential buyers, sellers, or perhaps other real estate agents representing the other side of a potential sale, the real estate agent may wish to keep certain detailed and/or confidential information about one or more properties hidden from one or more other parties. In this case, classification markings may include "Agent," "Buyer," "Seller," "Other Agent."

In some embodiments, a user is not allowed access to objects 156A or maps 158A (nor should objects/maps be disseminated to users not allowed access to that information) unless the user has all classification markings specified in an access control list associated with the object 156A or map 158A. In some embodiments, the validity of a classification level can be checked, e.g., a set of classification markings can be considered to be valid if the set contains all required markings and no disallowed markings are a particular user.

In some embodiments, data can comprise one or more objects 156A. An object 156A can represent an entity such as a person, a place, an organization, an entity such as a building or road, or other noun, or an event that happens at a point in time or for a duration, a document or other unstructured data source such as an e-mail message, a news report, or a written paper or article, or a digital media item such as audio or video. An object 156A may have a type (e.g., Person, Event, Thing, or Document) and a display name which may be values of particular properties 156B of the object 156A.

Each object 156A may have one or more properties 156B. Properties 156B can be attributes of the object 156A that represent individual data items. Each property 156B of an object 156A may have a type and a value. Different types of objects 156A may have different types of properties 156B. In some embodiments, the properties 156B of an object 156A may be represented/characterized as/by metadata 156C, although metadata 156C can comprise other data or information related to an object 156A that is not necessarily a property of the object. For example, a house object 156 might have a "year built" property 156B, a "sold for" property 156B, etc. Other metadata can include other presentation elements that are not objects 156A or properties 156B. These other presentation elements may include textual notes, property boxes, audio content, video content, audio/video content, documents, or other presentable information. These other presentation elements are referred to as "presentation" elements because they may be presented on a map in addition to objects 156A. It should be understood that it is not a requirement that presentation elements and objects represent different types of information. Information represented by a presentation element can instead by represented by an object, and vice versa.

In some embodiments, the set of object types and the set of property types for each type of object can be defined according to a pre-defined or user-defined ontology or other hierarchical structuring of knowledge through sub-categorization of object types and property types according to their relevant and/or cognitive qualities. An object 156A may also be allowed to have more than one property 156B of the same type. For example, a house object 156A might have multiple "sold for" properties 156B.

In some embodiments, a property 156B and/or metadata 156C may be associated with an access control list that governs access users have to that property or metadata. In some embodiments, the level of access a user has to a property 156B or metadata 156C also affects the level of access the user has to an object 156A associated with the property 156B and/or metadata 156C.

When a user creates a new map 158A to be presented, that map 158A is created with a "minimum access classification" equal to the "maximum user markings" for the user creating the map. As alluded to previously, different versions of the same map referred to as views 158B in FIG. 1C, may be generated in accordance with one or more classification levels. That is, a map 158A can be thought of as having a set of "dynamic dissemination views" created for it automatically up to an "original classification." Each time a user chooses a new set or edits an existing set of permissions to use when viewing a map, a new dynamic dissemination view may be generated for the map with those new/modified permissions. An original classification can refer to the maximum data, e.g., one or more objects 156A allowable on the map. Dynamic dissemination views of a map can include different subsets of the maximum data allowable on the map. For example, if a real estate agent creates a map, it can be created with a minimum access classification specifying the map can be viewed with a minimum classification level of "buyer" or "seller." Dynamic dissemination views can be generated up to a classification level of "real estate agent," which can be the original classification for that map. A buyer or seller having maximum user markings that may not satisfy that of the real estate agent classification level, may only see dynamic dissemination views commensurate with the buyer and seller classification levels.

In some embodiments, the minimum access classification associated with a map can be changed. To accommodate changes to the minimum access classification of a map 158C, a user may be allowed to change a current "viewing set" associated with the map, where the viewing set can refer to the set of effective classification markings that enable viewing of a map from the perspective of multiple users. Data with a classification may only be visible if that classification is deemed as being "satisfied" by all sets of effective classification markings contained within the viewing set. This can be used to handle situations where one user wants to publicly present a map to an audience of multiple different users that may not have a common relationship of some sort. The effective classification markings are the subset of a user's maximum user markings which a user is choosing to use when viewing the map. Only data whose classification (i.e., classification 156D of an object 156A) can be satisfied by this set of markings is visible in a map. As such, the map's overall classification banner (which can be stored as part of classification information 158C) can be generated from the effective classification markings. Multiple users may be collaborating on the same map while viewing it with different sets of effective classification markings, and users may even choose to view a map with markings that do not satisfy a minimum access classification.

User details comprising user information 152 can represent relevant aspects of a user and classification level information comprising user access control information 154 can be changed. Users may either "have access," "have no access," "gain access," or "lose access" to a map depending on the specifics of the representative user. As part of reclassifying a map, users whose maximum user markings are a superset of the markings for a representative user can be allowed to, e.g., enter a read-only preview mode for a map before the original classification is changed. While in the preview mode, a current classification banner remains unchanged. This is because the preview mode involves only temporarily redacting a user's view of the map. In some embodiments, the map may also not be edited while being previewed. As described above, locking a map and allowing a user to temporarily downgrade his/her classification level so that the map, along with any associated objects 156A and/or folders in which objects 156A may be contained, can be previewed is done to protect against subtle data leaks. Once the reclassifying user has reviewed the impact that their change might have, they can finalize the reclassification that can be stored as a new minimum access classification for that map as part of classification information 158C

As described above, users are allowed to view a map with a subset of their maximum user markings, i.e., the aforementioned viewing set or effective classification markings. When choosing a new viewing set, the user is in fact choosing a set of classification markings. Searches and object loads can be run with this viewing set, but data added to the map may be classified with manual data classification which can be stored as object classification information 156D. Manually added data classification can refer to the classification for data currently being added by a given user, e.g., user-created annotations, folders, uploaded data, etc. In some embodiments, the manually added data classification defaults to that generated from the effective classification markings of a map. It should be understood that classifications can be sub-classifications of other classifications, and classifications can "fork" in different ways. For example, downgrading to a classification level can be straightforward. However, downgrading to an access control group may involve multiple user classification levels. Thus the totality of map classification information 158C, object classification 156D, and user access control information 154 is considered.

In general, data added to the map is secured with the classification that represents the current effective classification markings of the map view. As such, the classification banner, which is a view representative of the effective classification markings, will always represent the maximum classification of all data on the map. The specific semantics of how data is classified when added to the map differ based on the type of data being added to the map.

Searches may be thought of as comprising two parts, e.g., the classification of the search folder itself, which protects the query and metadata (stored as search classification information 160A), and the classification for the search results when run with a given set of markings (stored as search results classification information 160B). In order to preserve provenance, search results may not be removed from the search folder. When declassifying a search folder, the search can be rerun with a less permissive set of markings, and a user interface presented by map application 300 may articulate that the query itself will now have a lower classification. This declassification can yield a more accessible search query with two subsections, each of which can be individually protected by a set of classification markings. In some embodiments, searches are configured such that for every search folder which is visible to the user, there is at least one search results section which is also visible. Both search folders and search results sections can be visible if their classification is satisfied by the viewing set.

For example, when a search is run, the resulting search layer is restricted to a manual data classification (which can comprise search classification information 160A) which protects search terms and other metadata about a search. The search can then be run with the classification markings from the viewing set of the map. Search results are stored with this viewing set so that users can look at many different result sets for the same query. Search templates may also be classified with a classification which can be stored as search classification information 160A, where the templates are only shown if the active viewing set satisfies the classification for that template. When viewing a search folder, a user can see subsections for any permissions that the query has been run at which are satisfied by the viewing set. In some embodiments, as a default, the highest subsection that is shown is that which is satisfied by the viewing set. Search folders can be redacted if their classification is not satisfied by the viewing set.

As described above, users may generate a link allowing a recipient(s) of the link to access map at a particular classification level, wherein aspects of the access resulting from the link can be monitored. Moreover, certain recipient characteristics such as the Internet Protocol (IP) address from which the map is being access may be monitored. Such monitored information may be stored in database 150 as monitored link information 162A along with any relevant link information 162 that may characterize one or more aspects of the link itself.

Information regarding and/or relevant to geo-fence dissemination views may be stored as geo-fence information 164. As described herein, geo-fence dissemination views can be thought of as filters 164A applied to a base layer, the base layer being some specified object(s) of interest at a particular classification level (if more than one exist/are possible). That is, objects of a layer that fall under or enter an area defined to be a geo-fenced dissemination view may be imbued with the classification level 164C specified for that geo-fenced dissemination view, e.g., declassified from a higher original classification to that of the geo-fenced dissemination view. As objects move around the map, the specified filter(s) applicable to a geo-fenced dissemination view can be reapplied. In this way, filters can be applied relatively quickly. "High-scale" layers (layers encompassing large amounts of data) can be filtered before rendering any objects within a geo-fenced dissemination view, thereby reducing the number of data elements or objects that must be rendered and/or presented.

Besides the objects themselves, a user may specify one or more property or type filters 164B as part of the parameters characterizing a geo-fenced dissemination view. The property or type filters can be applied to object properties 156B and metadata 156C of objects within the geo-fenced dissemination view. Geo-fence filter 164A and property or type filters 164B can be specified to be operative within a particular time duration(s).

Map Sharing Methodology

Figure 2A:
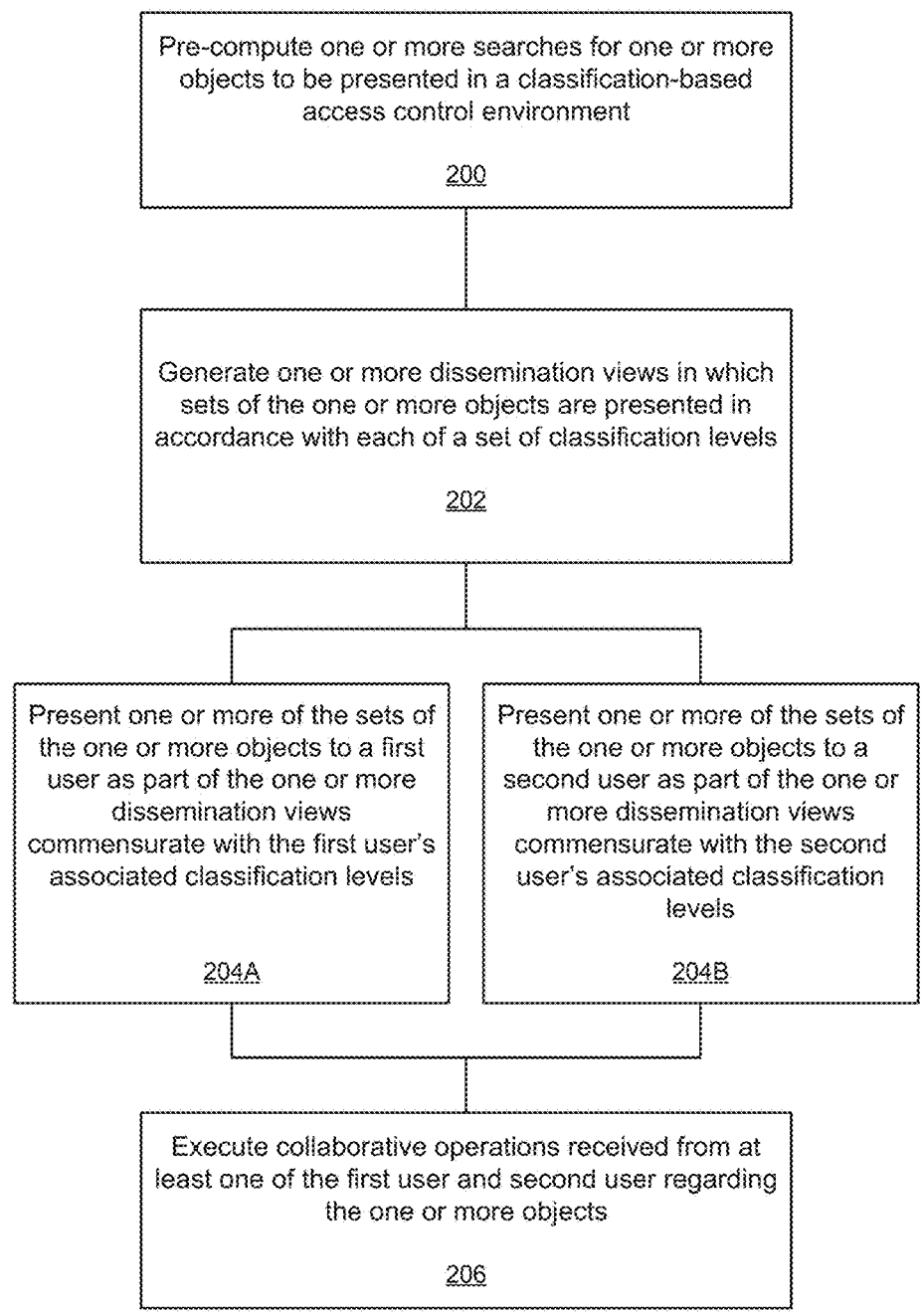
FIG. 2A is a flow chart illustrating example operations that may be performed to effectuate classification-based access control collaboration in accordance with various embodiments.

FIG. 2A is a flow chart illustrating example operations performed to provide map collaboration in accordance with various embodiments. At operation 200, one or more searches may be pre-computed for one or more objects to be presented in a classification-based access control environment. For example, a map may be generated, where the map can include one or more objects representative of data, e.g., buildings, people, roads, properties of those objects, as well as metadata associated with those objects. The one or more pre-computed searches are run to discover/identify such objects at different classification levels such that different views of the map can be generated for users having those different classification levels.

Accordingly, at operation 202, one or more dissemination views are generated in which sets of the one or more objects are presented in accordance with each of a set of classification levels. As described above, multiple dynamic dissemination views of a map can be generated up to a maximum or highest classification level. It should be understood that various embodiments disclosed herein refer to high, low, minimum, maximum aspects, such classification levels or user markings, but such characterizations are merely examples, and a lowest classification level, for example, can be used refer to a classification level allowing the least amount of access. That is the level of restriction associated with a classification level can be labeled or referred to in different ways and/or described in accordance with different perspectives.

At operation 204A, one or more of the sets of the one or more objects are presented to a first user as part of the one or more dissemination views commensurate with the first user's associated classification level. At operation 204B, one or more of the sets of the one or more objects are presented to a second user as part of the one or more dissemination views commensurate with the second user's associated classification levels. In this way, each user may view his/her classification level-appropriate version of the map. For example, if the first user's associated classification level is less restrictive, e.g., higher, than that associated with the second user, the second user may only see a subset of the one or more objects that the first user may see. As used in this context, a subset can refer to some set of objects less than the original set of objects, or alternatively, to some aspect or characteristic of one or more objects in the original set that reveals "less" information than would be revealed, e.g., to the first user if the first user has a higher classification level.

At operation 206, collaborative operations received from at least one of the first and second users regarding the one or more objects may be executed. For example, the first user may wish to present a particular dissemination view to the second user. The first user may wish to annotate a map in which the one or more objects are displayed, wherein some annotations may be classified above the classification level of the second user, thereby remaining hidden from the second user, while other annotations are classified at or below the classification level of the second user, thereby appearing to the second user. In some embodiments, the second user may wish to share his/her dissemination view with another party by generating a link as described herein.

Figure 2B:
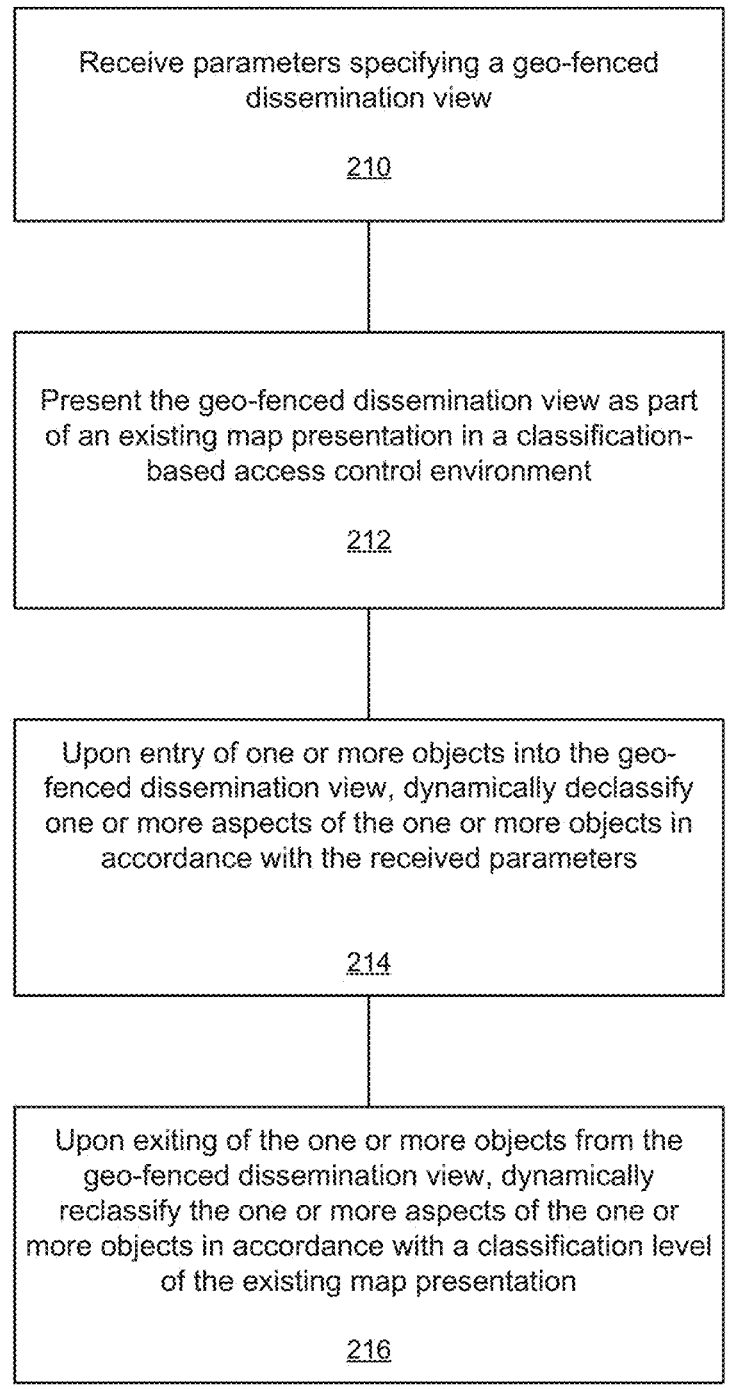
FIG. 2B is a flow chart illustrating example operations that may be performed to generate geo-fenced dynamic dissemination views in accordance with various embodiments.

FIG. 2B illustrates example operations that can be performed to provide a geo-fenced dissemination view in accordance with various embodiments. At operation 210, parameters specifying a geo-fenced dissemination view are received. For example, a user may be a taxi dispatcher that can use a classification-based access control environment to share maps and data within those maps to taxi owners that employ taxi drivers. Taxi dispatchers can be privy to information, location, etc. regarding taxis belonging to multiple owners, but taxi owners may not want to share information outside of the dispatch region with a given dispatcher. As such, the taxi owners may each create a geo-fence and declassify the locations of their taxis within the region in order to provide the dispatcher with the information required to respond to routing requests.

In other embodiments, the taxi dispatcher may wish to share, e.g., location/status information regarding a particular taxi owner's taxis with the taxi owner without a geo-fence. The specified parameters can include a layer regarding the particular taxi owner and his/her taxis. Other specified parameters can include a specification of heavily-traveled areas, such as airports, that tend to generate high revenue. The taxi owner may wish to see which of this taxis and which of his taxi drivers are diligent in frequenting airports, as well as revenue collected. This information may be another parameter. The parameters can be specified as filters applied to the base "taxi owner" layer. Obviously, the taxi dispatcher would not want to reveal the location/performance/identity of other taxi owners' drivers, and declassifying an entire city for a taxi owner may be resource-intensive and practically not useful to the taxi owner.

At operation 212, a geo-fenced dissemination view can be presented as part of an existing map presentation in a classification-based access control environment. Continuing the above example, the taxi dispatcher may be viewing a map in the city of operation. Access to views of this map may be governed through classification-based access control described herein. The geo-fenced dissemination view created for the particular taxi owner can be displayed under a classification banner, e.g., "taxi owner," the map being displayed under a high classification level banner, e.g., "taxi dispatcher."

At operation 214, upon entry of one or more objects into the geo-fenced dissemination view, one or more aspects of the one or more objects can be dynamically declassified in accordance with the received parameters. That is, the aforementioned user-specified filters can be applied to objects of the base layer that have entered or are within the geographical boundaries of the geo-fenced dynamic dissemination view. At operation 216, upon exit of the one or more objects from the geo-fenced dissemination view, dynamically reclassify the one or more aspects of the one or more objects in accordance with a classification level of the existing map presentation.

The moment at which the declassification and/or reclassification occurs can vary in some embodiments, depending on the speed of an object, the size of an object, the desired responsiveness of the system, etc. It should be noted that the specified boundary(ies) can take on nearly any shape or form that the user may desire.

Example Map Sharing User Interfaces

Figure 3A:
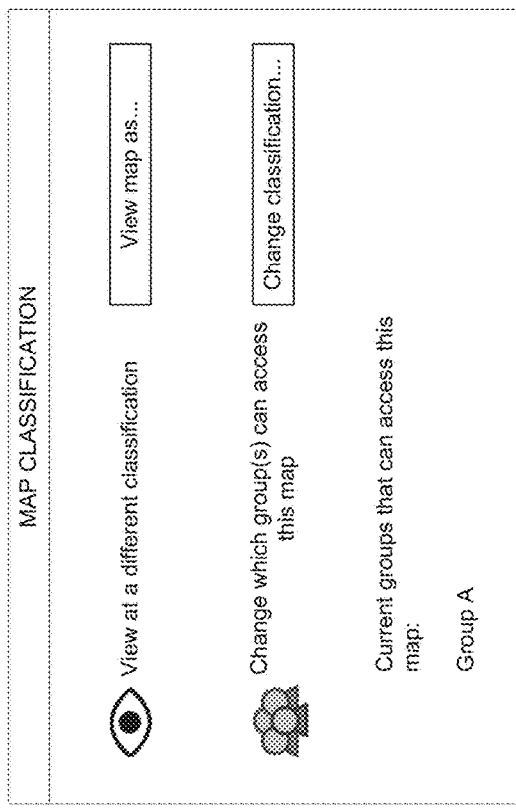
FIG. 3A illustrates an example user interface for changing map classification in accordance with various embodiments.
Figure 3B:
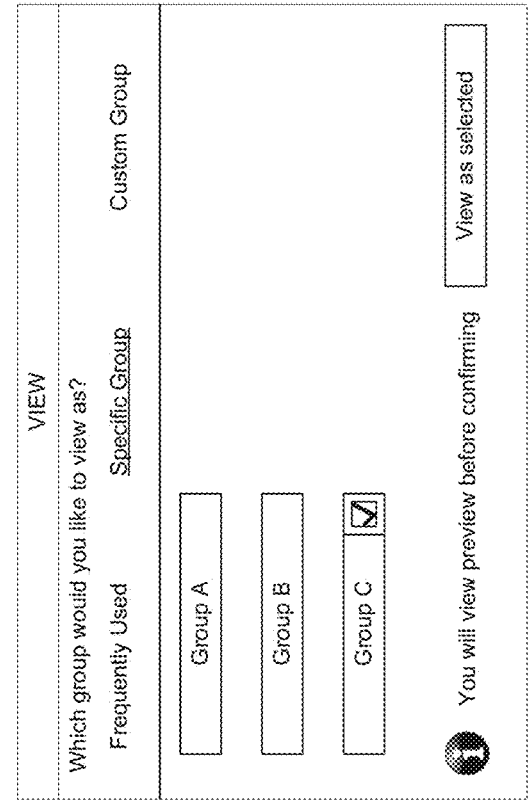
FIG. 3B illustrates an example user interface for specifying a view perspective with which to view a map in accordance with various embodiments.

FIG. 3A illustrates an example user interface that may be presented to a user allowing the user to specify a map's classification. For example, a user may specify a particular classification level at which the map is to be viewed. For example, a user can change which access groups can access a particular map. FIG. 3B illustrates another example user interface with which a user can select to view a map in accordance with a particular group's characteristics. Moreover, FIG. 3B illustrates an example notification, described above, regarding a preview mode. That is, to ensure a user is aware of any potential security leaks, the user may be required to preview a map view at the selected group classification level.

Figure 3C:
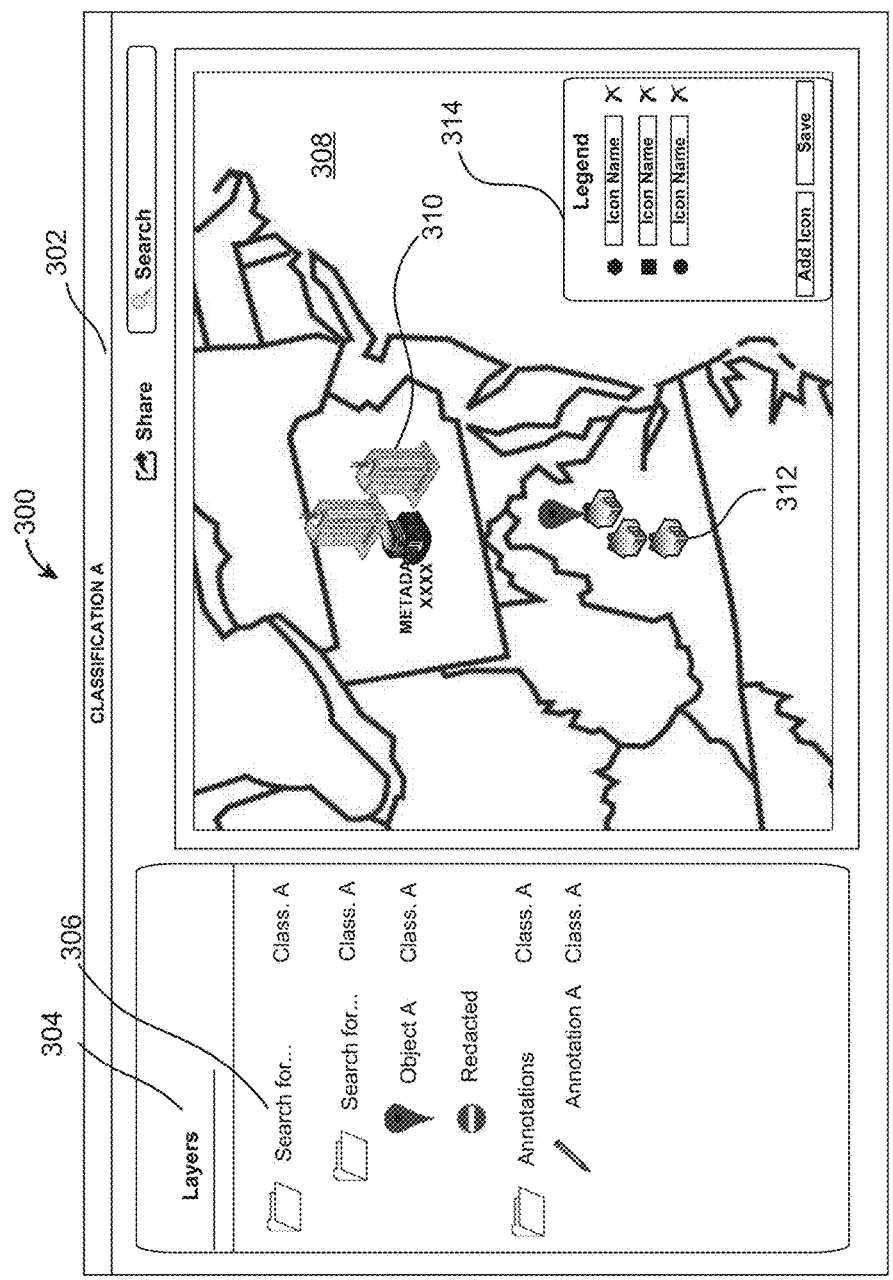
FIG. 3C illustrates an example map view of a map presented in accordance with one classification level.

FIG. 3C illustrates an example user interface 300 used for presenting a map in accordance with various embodiments. The example user interface 300 is illustrated as being presented under a classification banner 302, which in this example reflects a classification level "Classification A." On the left side of the user interface 300 may be an informational area 304, a portion of which can include any layers 306 used to make up a map view 308 shown to the right of the informational area. As discussed previously, layers 306 can include search layers, annotation layers, etc. Moreover, objects, such as drop pins and indications of redacted elements may also be presented to a user of user interface 300.

The map view 308 section of user interface 300 displays an area of interest and any objects, such as a buildings, houses, and any related objects, such as the aforementioned drop pins. For example, a first group of buildings 310 may include several buildings in some geographic proximity to each other, where one of the buildings may have certain metadata associated with it. As described above, these objects and metadata may all be associated with one or more classification levels governing how and/or to whom they may be displayed. A group of houses 312 is also displayed in the map view.

Also illustrated in FIG. 3C is a dynamic legend interface 314. Various embodiments allow a user to select what items of a legend may be presented or displayed in conjunction with a map view, as well as, e.g., with what portion(s) of an area is presented in the map view. A user may customize legend icons, names, specify the areas where particular legend items are presentable, etc.

Figure 3D:
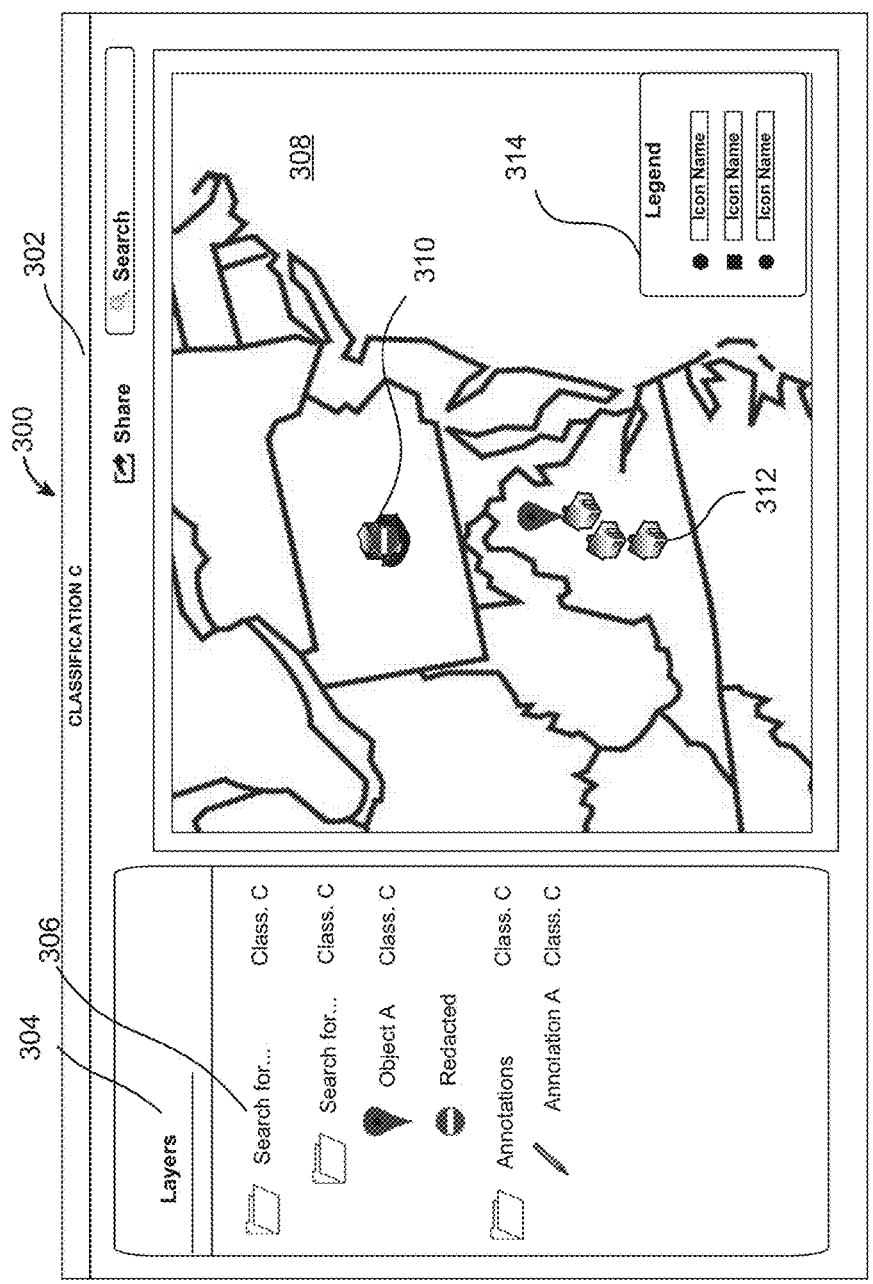
FIG. 3D illustrates an example map view of the map of FIG. 3C presented in accordance with another classification level.

FIG. 3D illustrates the same example user interface 300, but presented to another user, which in this example, may have a lower classification level (e.g., "Classification C") than that of the user to which the user interface 300 is presented in FIG. 3C. This can be reflected in classification banner 302. One can appreciate that the first group of buildings 310 may no longer display two of the three buildings displayed to the user of user interface 300 in FIG. 3C. Moreover, the metadata that was displayed in FIG. 3C is no longer displayed in FIG. 3D. In some embodiments, redacted information may be hidden completely, or in this case shown as being redacted.

Figure 3E:
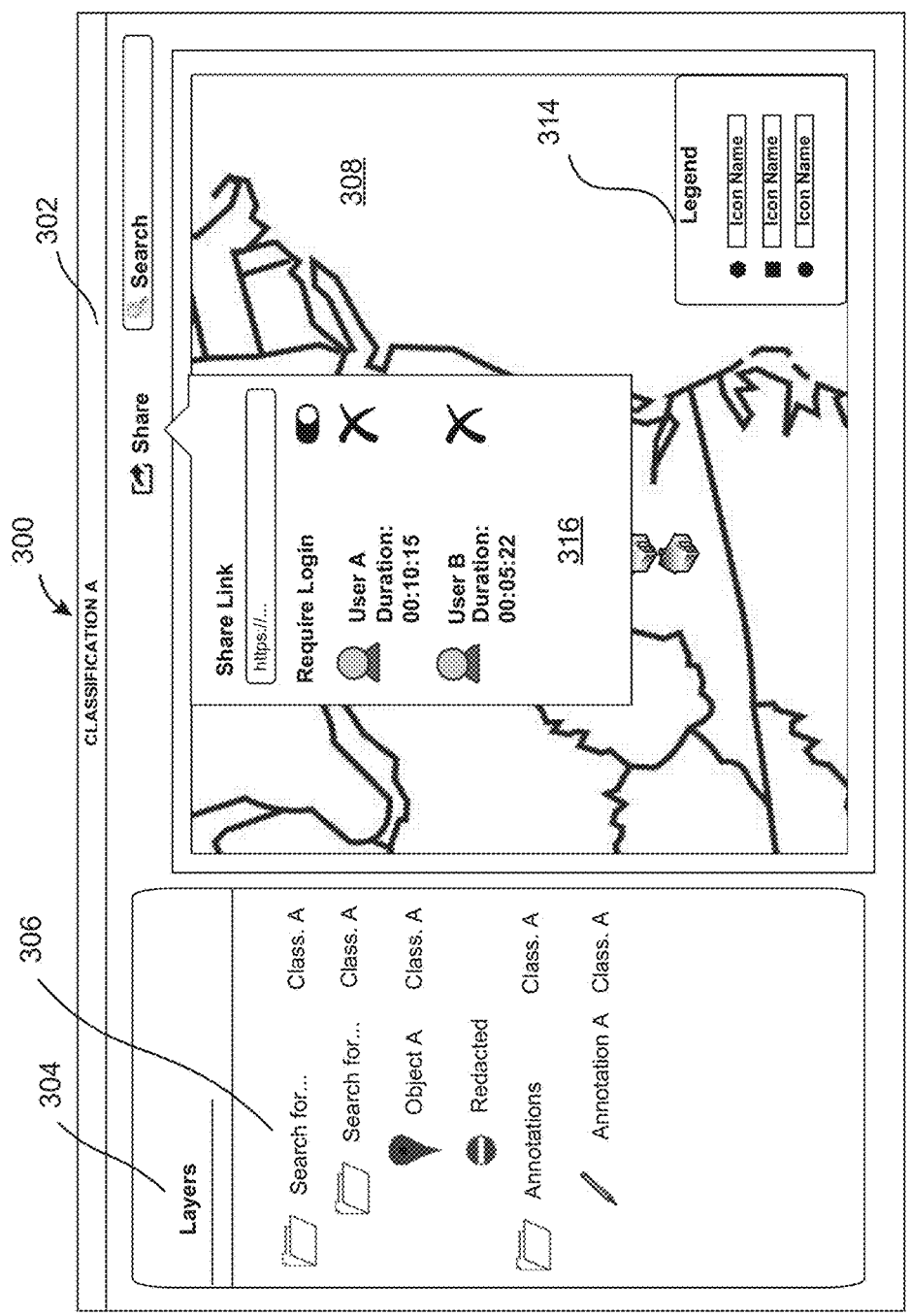
FIG. 3E illustrates an example link sharing user interface in accordance with various embodiments.

FIG. 3E illustrates example user interface 300, where a user is leveraging the link sharing option. A link sharing interface 316 may be presented to the user which includes the link to be shared with one or more recipients. As previously discussed, the link can be automatically generated in accordance with the appropriate classification banner applicable to the current map view, e.g., by serializing the classification banner, and including that in the link URL. As also previously discussed, the user may monitor certain aspects of map views accessed through shared links, e.g., which users are viewing the shared map view, and for how long. It should be noted that other aspects of the map view presented to link recipients can be monitored depending on system preferences, operating design choices, etc., so long as the requisite information is/is allowed to be monitored/derived. Moreover, a user may choose to revoke a shared map view if he/she chooses to do so at any time. Although not illustrated, it should be understood that users trying to access outdated links or have had their access revoked may be informed as such through one or more appropriate notifications.

Figure 3F:
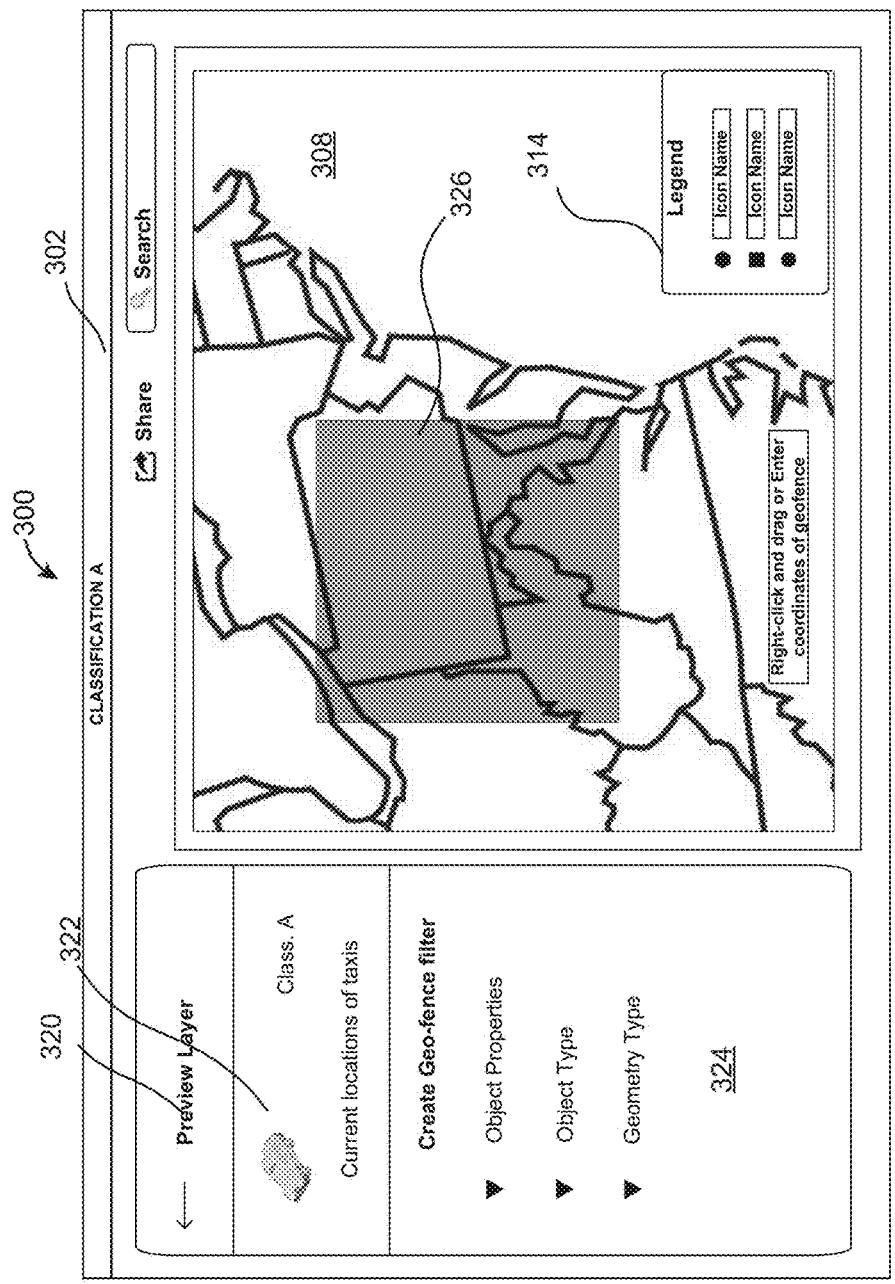
FIG. 3F illustrates an example user interface for specifying geo-fenced filter parameters in accordance with various embodiments.

FIG. 3F illustrates user interface 300 including an example geo-fenced dynamic dissemination view user interface 324 in accordance with some embodiments. As previously discussed, user interface 300 can provide a preview of a map 308. In this case, the preview is used in the context of generating a geo-fenced dynamic dissemination view 326 in map 308. A preview layer 320, e.g., taxis having a classification level "class. A" 322 can be specified by a user. Through user interface 324, the user may specify various parameters used to create filters applied in the geo-fenced dynamic dissemination view 326 on objects that are taxis. The user may specify the boundaries of geo-fenced dynamic dissemination view 326 by, e.g., clicking and dragging, entering map coordinates, and other known methods.

Figure 3G:
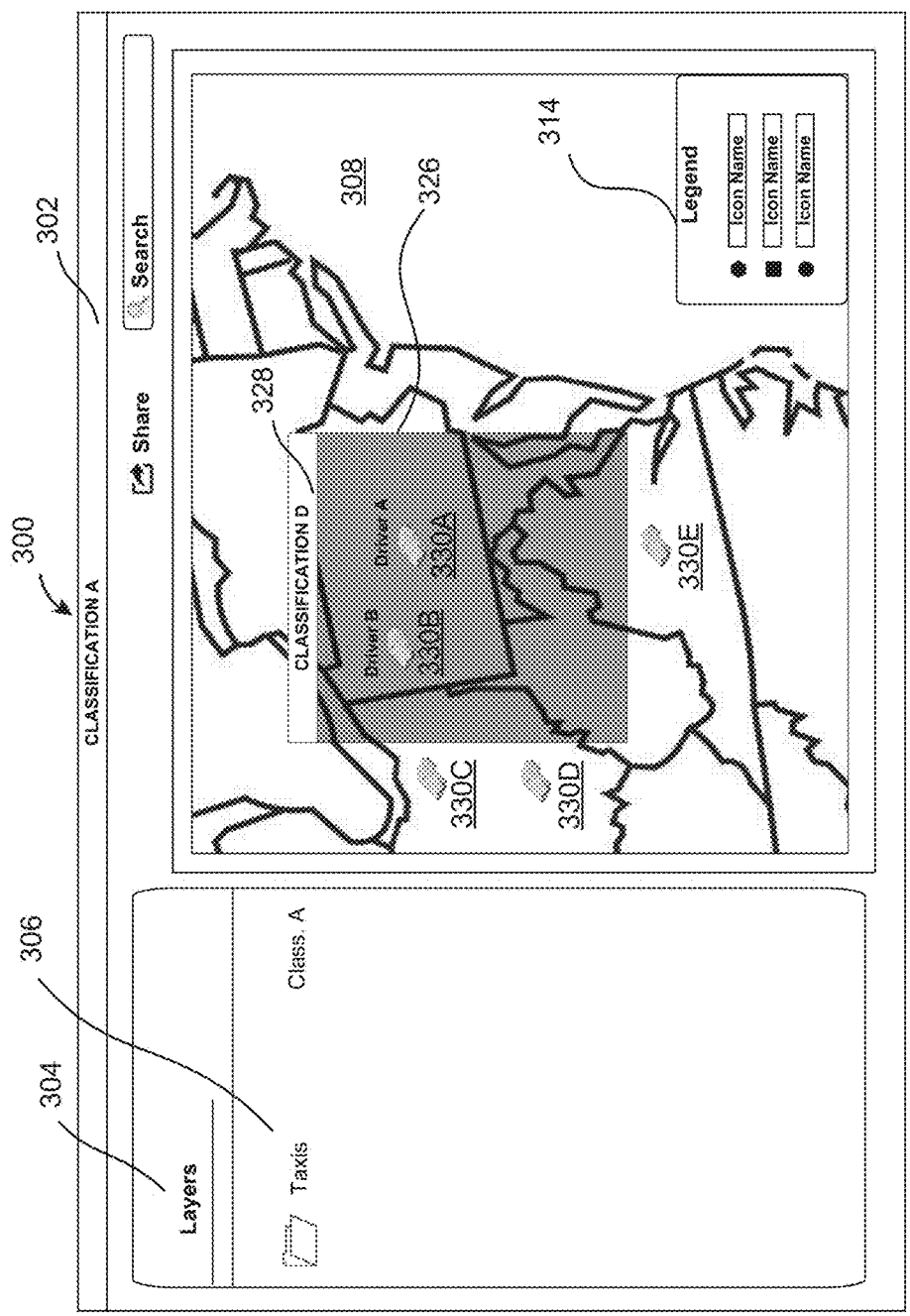
FIG. 3G illustrates an example presentation of a geo-fenced dissemination view in accordance with various embodiments.

FIG. 3G illustrates user interface 300 after reverting back to the map view (subsequent to specifying the desired parameters. FIG. 3G shows that layers displayed in informational area 304 includes the specified taxi layers and classification level. In this example, objects, e.g., taxis 330A and 330B are in or have entered into geo-fenced dynamic dissemination view 326. While in geo-fenced dynamic dissemination view 326, these objects can be presented with or can be selected to display releasable information, e.g., a driver identification, in this example. Other taxi objects 330C-330E that are not in geo-fenced dynamic dissemination view 326 do not reveal driver identification information. If taxi 330A were to exist geo-fenced dynamic dissemination view 326, it would be understood that its driver identification would cease to show. Likewise, if taxi 330E were to enter geo-fenced dynamic dissemination view 326, its driver identification (provided other filter constraints are met) would be displayed. It should be noted that a classification banner 328 is used to present geo-fenced dynamic dissemination view 326 as described herein.

Example Computer System

Figure 4:
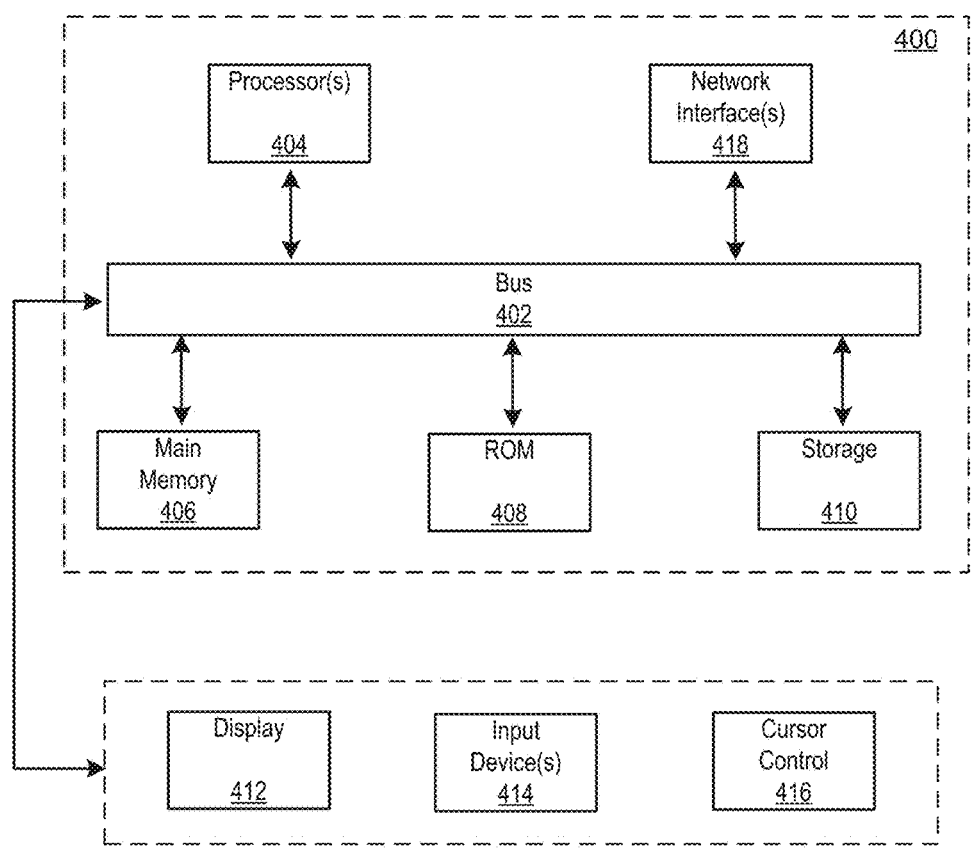
FIG. 4 illustrates a schematic representation of an example computer system in which any of the implementations described herein may be implemented.

FIG. 4 depicts a block diagram of an example computer system 400 in which any of the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to a display 412, such as a cathode ray tube (CRT) or LCD display (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may retrieves and executes the instructions. The instructions received by main memory 406 may optionally be stored on storage device 410 either before or after execution by processor 404.

The computer system 400 also includes a communication interface 418 coupled to bus 402. Network interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, network interface 418 may be a local area network (LAN) card to provide a data communication connection to a compatible LAN (or WAN component to communicated with a WAN). Wireless links may also be implemented. In any such implementation, network interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418.

The received code may be executed by processor 404 as it is received, and/or stored in storage device 410, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

The invention claimed is:

1. A system comprising:
one or more processors; and
memory storing instructions that, when executed by the one or more processors, cause the system to:
generate a plurality of views of a map, each of the plurality of views comprising one or more objects presentable in accordance with a plurality of classification levels;
present a first geo-fenced view comprising a first virtual boundary encompassing a first subset of the map in conjunction with one of the plurality of views of the map;
present a second geo-fenced view comprising a second virtual boundary encompassing a second subset of the map in conjunction with the one of the plurality of views of the map, at least a portion of the second geo-fenced view overlapping at least a portion of the first geo-fenced view;
reclassify one or more aspects of at least one of the one or more objects contained within the first virtual boundary and the second virtual boundary to a different classification level, the different classification level not being included in the plurality of classification levels, the different classification level comprising a logical combination of a set of first parameters of a first classification level of the plurality of classification levels associated with the first geo-fenced view and a subset of second parameters of a second classification level of the plurality of classification levels associated with the second geo-fenced view;
cause, by a second reclassifying, at least one of the objects contained within the first virtual boundary and the second virtual boundary to be redacted;
present, in response to the reclassifying one or more aspects of at least one of the one or more objects contained within the first virtual boundary and the second virtual boundary to a different classification level, at least a portion of the one or more reclassified aspects of the at least one of the one or more objects in the first geo-fenced view;
present, in response to the second reclassifying, an indication of the at least one redacted object in a classified search interface presented in conjunction with at least a portion of the map;
present the first geo-fenced view within a window defined by a classification banner.

2. The system of claim 1, wherein the plurality of classification levels characterize amounts of information revealable by or through the one or more objects.

3. The system of claim 1, wherein the one or more objects comprise at least one of entities represented as objects on the map, and wherein the one or more aspects of the objects comprise one or more properties of the objects, one or more object types, user-generated annotations, and metadata associated with one or more of the objects.

4. The system of claim 1, wherein the instructions that, when executed by the one or more processors, cause the system to generate the first geo-fenced view comprise instructions that, when executed by the one or more processors, cause the system to render one or more layers of the map in accordance with the plurality of classification levels, the one or more layers being representative of the one or more objects.

5. The system of claim 4, wherein the instructions that, when executed by the one or more processors, cause the system to generate the first geo-fenced view comprise instructions that, when executed by the one or more processors, cause the system to apply one or more filters adapted to select a subset of the one or more objects to be declassified.

6. The system of claim 1, wherein the classification banner associated with the geo-fenced view is representative of a classification level that is more restrictive than that associated with the one of the plurality of views of the map presented in conjunction with the first geo-fenced view.

7. The system of claim 1, wherein the one or more objects comprise moving data sets within the map.

8. The system of claim 1, wherein the instructions, when executed by the one or more processors, cause the system to further reclassify the one or more aspects of the one or more objects upon the at least one of the one or more objects exiting the first geo-fenced view.

9. The system of claim 1, wherein the instructions further cause the system to:
   present, in response to the reclassifying one or more aspects of at least one of the one or more objects contained within the first virtual boundary and the second virtual boundary to a different classification level, at least a portion of the one or more reclassified aspects of the at least one of the one or more objects in the at least a portion of the first geo-fenced view overlapped by the at least a portion of the second geo-fenced view, the at least a portion of the one or more reclassified aspects of the at least one of the one or more objects not being presentable in the first geo-fenced view according to the first classification level or the second geo-fenced view according to the second classification level.

10. A method being implemented by a computing system including one or more physical processors and storage media storing machine-readable instructions, the method comprising:
   generating a plurality of views of a map, each of the plurality of views comprising one or more objects presentable in accordance with a plurality of classification levels;
   presenting a first geo-fenced view comprising a first virtual boundary encompassing a first subset of the map in conjunction with one of the plurality of views of the map;
   presenting a second geo-fenced view comprising a second virtual boundary encompassing a second subset of the map in conjunction with the one of the plurality of views of the map, at least a portion of the second geo-fenced view overlapping at least a portion of the first geo-fenced view;
   reclassifying one or more aspects of at least one of the one or more objects contained within the first virtual boundary and the second virtual boundary to a different classification level, the different classification level not being included in the plurality of classification levels, the different classification level comprising a logical combination of a set of first parameters of a first classification level of the plurality of classification levels associated with the first geo-fenced view and a subset of second parameters of a second classification level of the plurality of classification levels associated with the second geo-fenced view;
   causing, by a second reclassifying, at least one of the objects contained within the first virtual boundary and the second virtual boundary to be redacted;
   presenting, in response to the reclassifying one or more aspects of at least one of the one or more objects contained within the first virtual boundary and the second virtual boundary to a different classification level, at least a portion of the one or more reclassified aspects of the at least one of the one or more objects in the first geo-fenced view;
   presenting, in response to the second reclassifying, an indication of the at least one redacted object in a classified search interface presented in conjunction with at least a portion of the map; and
   presenting the first geo-fenced view within a window defined by a classification banner.

11. The method of claim 10, wherein the plurality of classification levels characterize amounts of information revealable by or through the one or more objects.

12. The method of claim 10, wherein the one or more objects comprise at least one of entities represented as objects on the map, and wherein the one or more aspects of the objects comprise one or more properties of the objects, one or more object types, user-generated annotations, and metadata associated with one or more of the objects.

13. The method of claim 10, further comprising rendering one or more layers of the map in accordance with the plurality of classification levels, the one or more layers being representative of the one or more objects.

14. The method of claim 13, further comprising applying one or more filters adapted to select a subset of the one or more objects to be declassified.

15. The method of claim 10, wherein the classification banner associated with the geo-fenced view is representative of a classification level that is more restrictive than that associated with the one of the plurality of views of the map presented in conjunction with the first geo-fenced view.

16. The method of claim 10, wherein the one or more objects comprise moving data sets within the map.

17. The method of claim 10, further comprising causing a further reclassifying of the one or more aspects of the one or more objects upon the at least one of the one or more objects exiting the first geo-fenced view.

18. The method of claim 10, further comprising:
   presenting, in response to the reclassifying one or more aspects of at least one of the one or more objects contained within the first virtual boundary and the second virtual boundary to a different classification level, at least a portion of the one or more reclassified aspects of the at least one of the one or more objects in the at least a portion of the first geo-fenced view overlapped by the at least a portion of the second geo-fenced view, the at least a portion of the one or more reclassified aspects of the at least one of the one or more objects not being presentable in the first geo-fenced view according to the first classification level or the second geo-fenced view according to the second classification level.

19. A non-transitory computer-readable medium storing a set of instructions that are executable by one or more processors to cause the one or more processors to perform a method comprising:
   generating a plurality of views of a map, each of the plurality of views comprising one or more objects presentable in accordance with a plurality of classification levels;
   presenting a first geo-fenced view comprising a first virtual boundary encompassing a first subset of the map in conjunction with one of the plurality of views of the map;

presenting a second geo-fenced view comprising a second virtual boundary encompassing a second subset of the map in conjunction with the one of the plurality of views of the map, at least a portion of the second geo-fenced view overlapping at least a portion of the first geo-fenced view;

reclassifying one or more aspects of at least one of the one or more objects contained within the first virtual boundary and the second virtual boundary to a different classification level, the different classification level not being included in the plurality of classification levels, the different classification level comprising a logical combination of a set of first parameters of a first classification level of the plurality of classification levels associated with the first geo-fenced view and a subset of second parameters of a second classification level of the plurality of classification levels associated with the second geo-fenced view;

causing, by a second reclassifying, at least one of the objects contained within the first virtual boundary and the second virtual boundary to be redacted;

presenting, in response to the reclassifying one or more aspects of at least one of the one or more objects contained within the first virtual boundary and the second virtual boundary to a different classification level, at least a portion of the one or more reclassified aspects of the at least one of the one or more objects in the first geo-fenced view;

presenting, in response to the second reclassifying, an indication of the at least one redacted object in a classified search interface presented in conjunction with at least a portion of the map; and presenting the first geo-fenced view within a window defined by a classification banner.

* * * * *